H. D. COLMAN.
WINDER.
APPLICATION FILED APR. 1, 1909.
1,191,102.
Patented July 11, 1916.
21 SHEETS—SHEET 1.
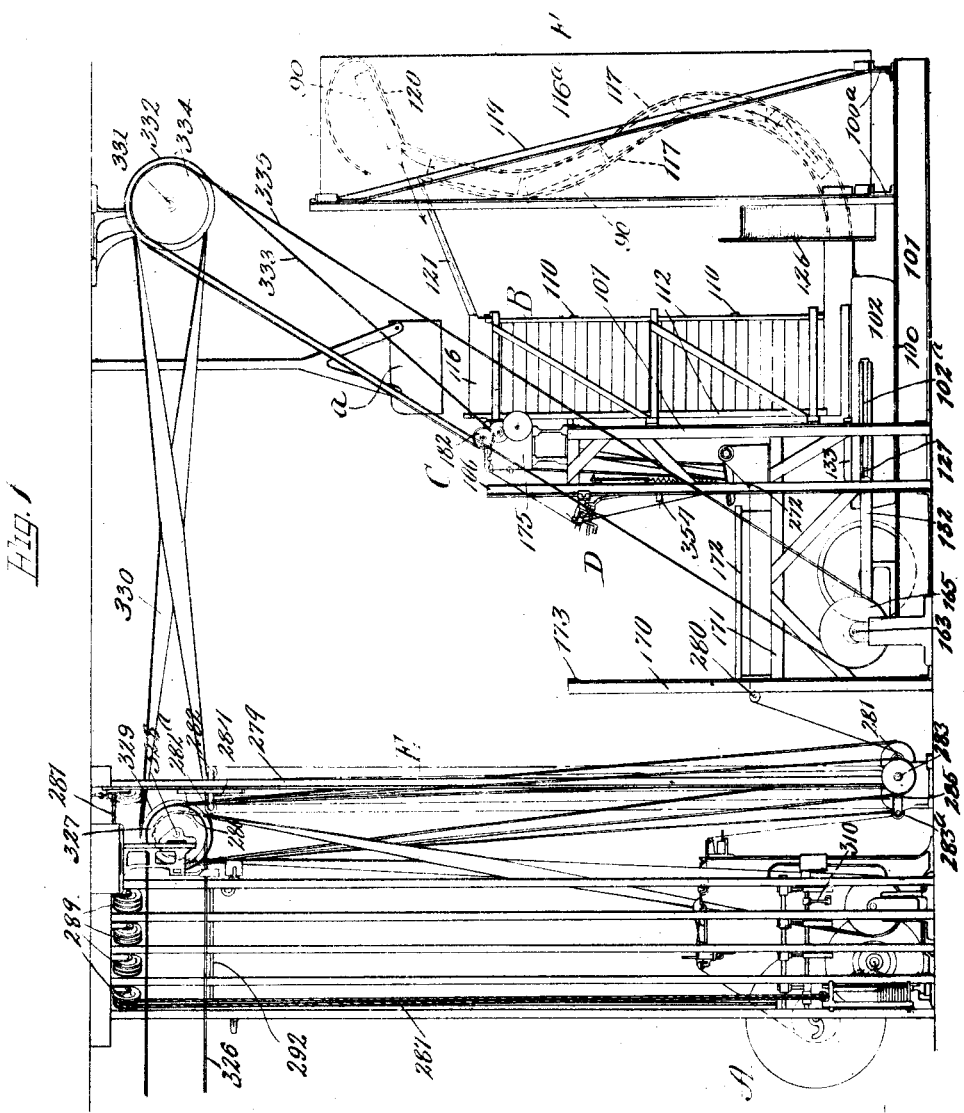
Witnesses
Ira J. Perry.
B. F. Funk.
Inventor
Howard D. Colman
By Luther L. Miller
Atty.

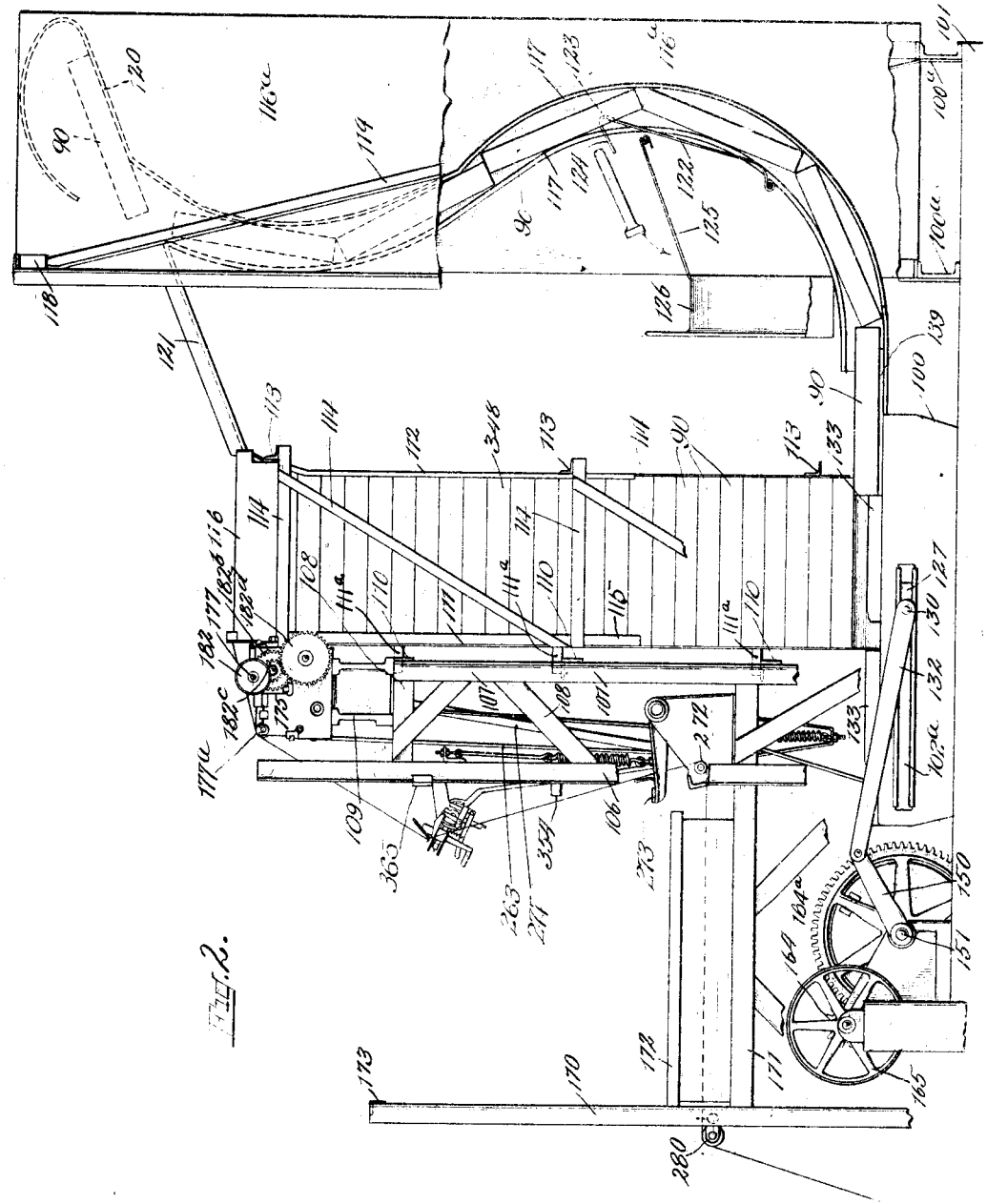

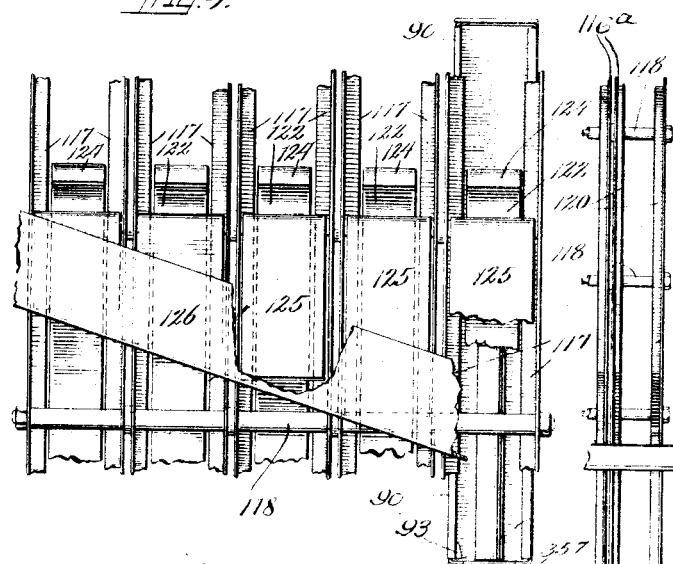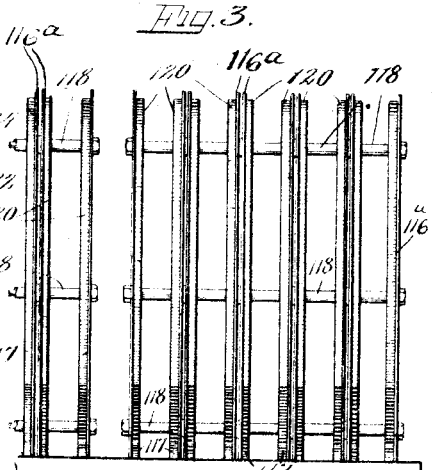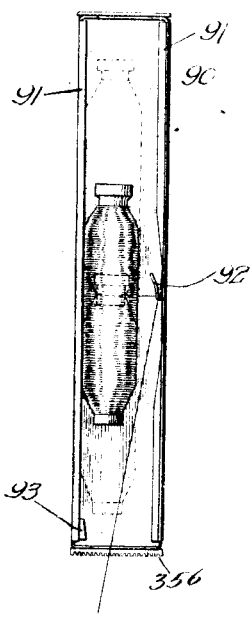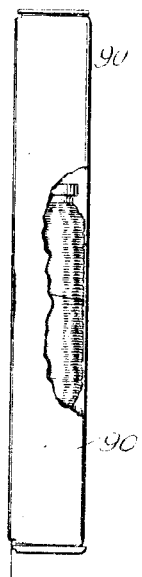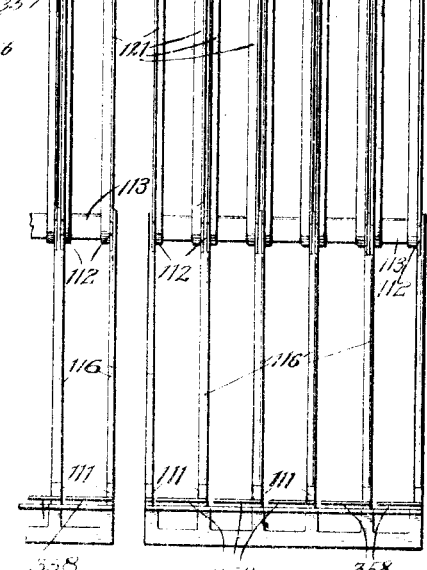

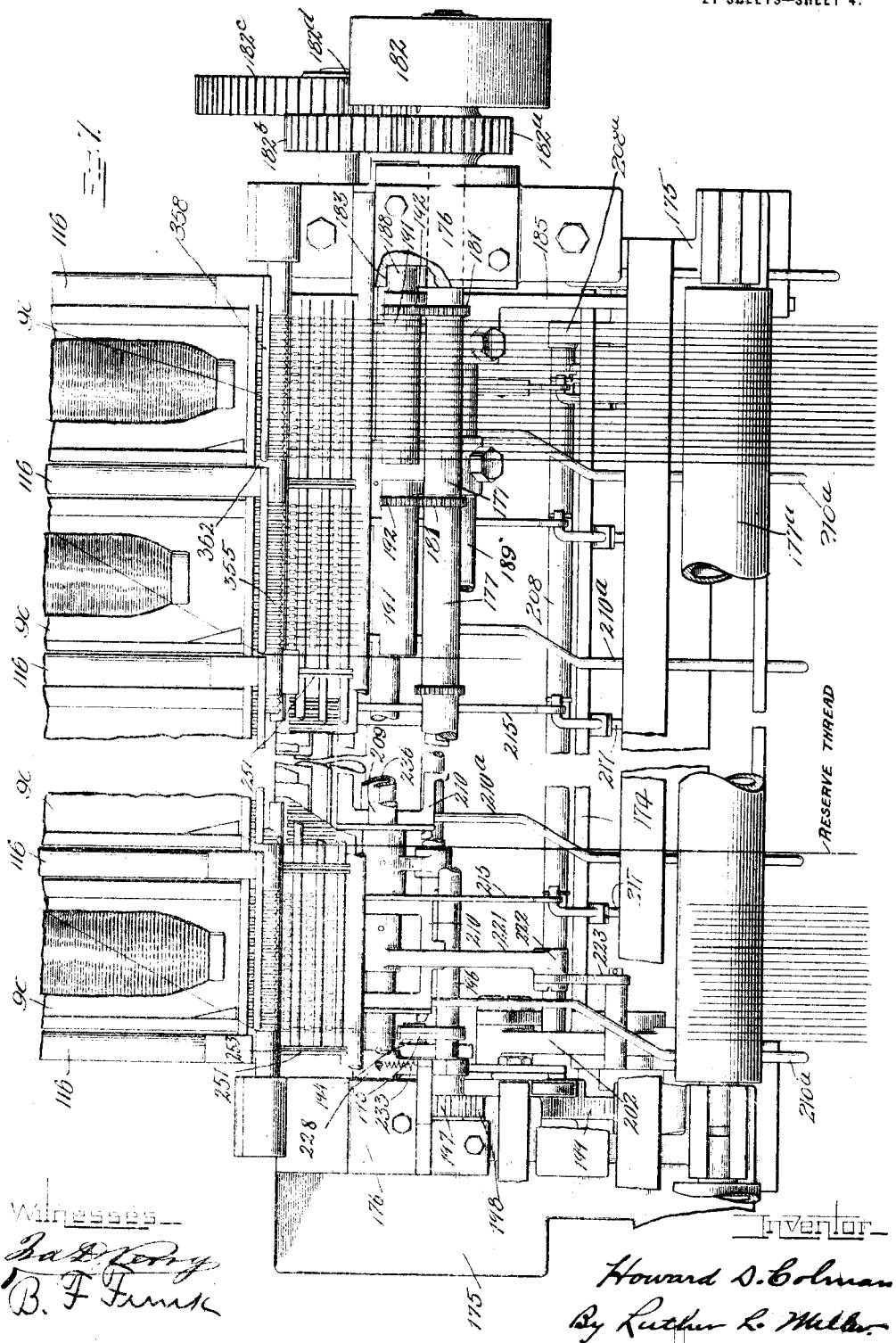

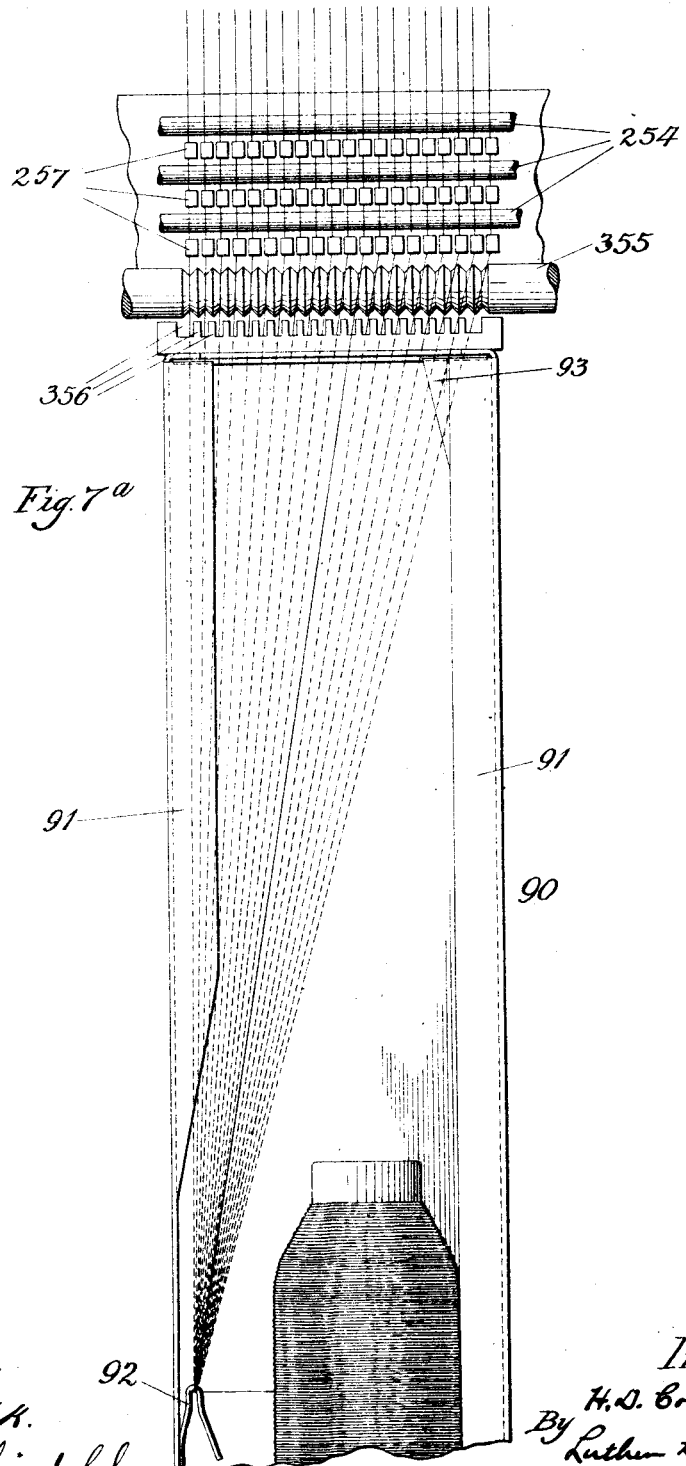

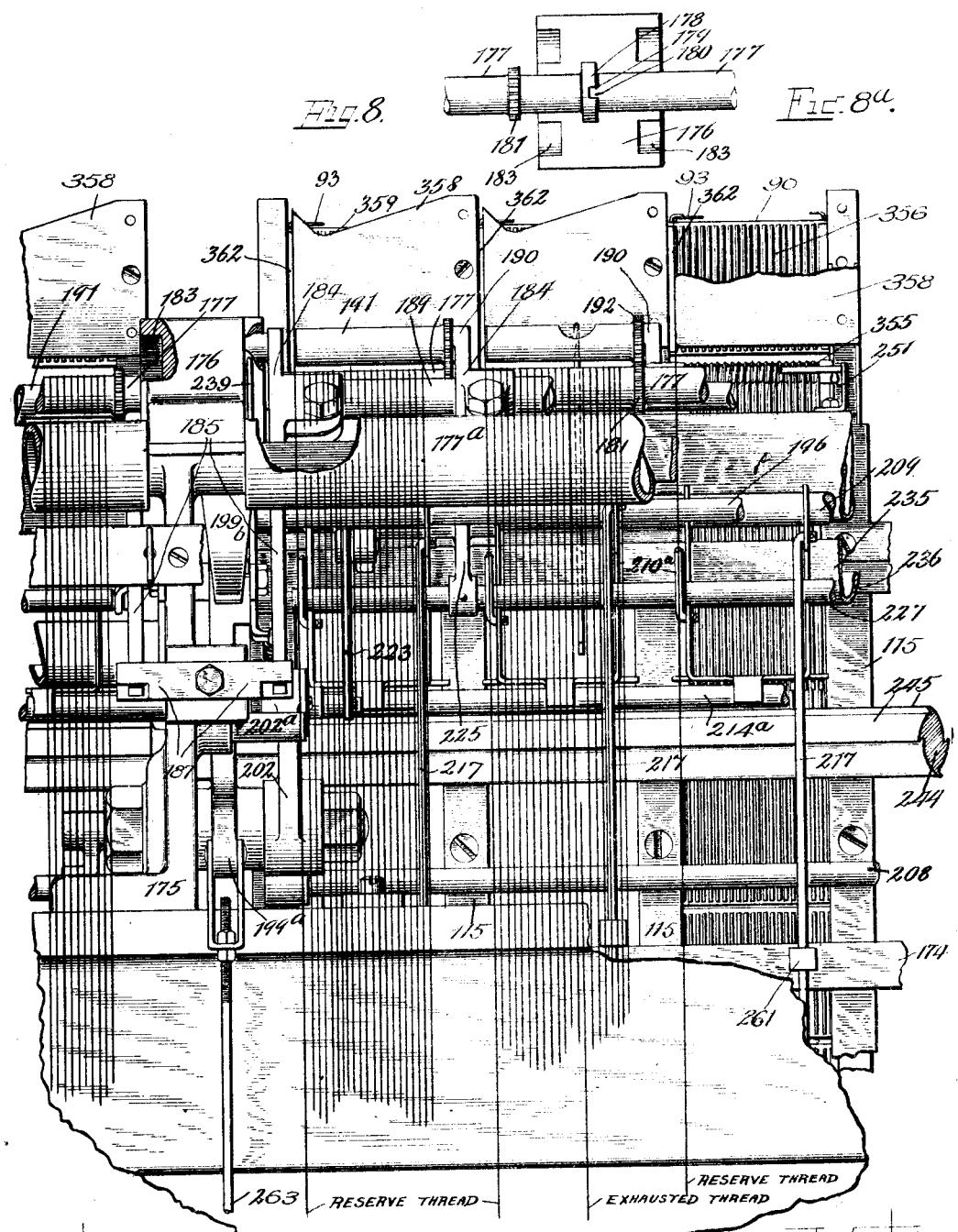

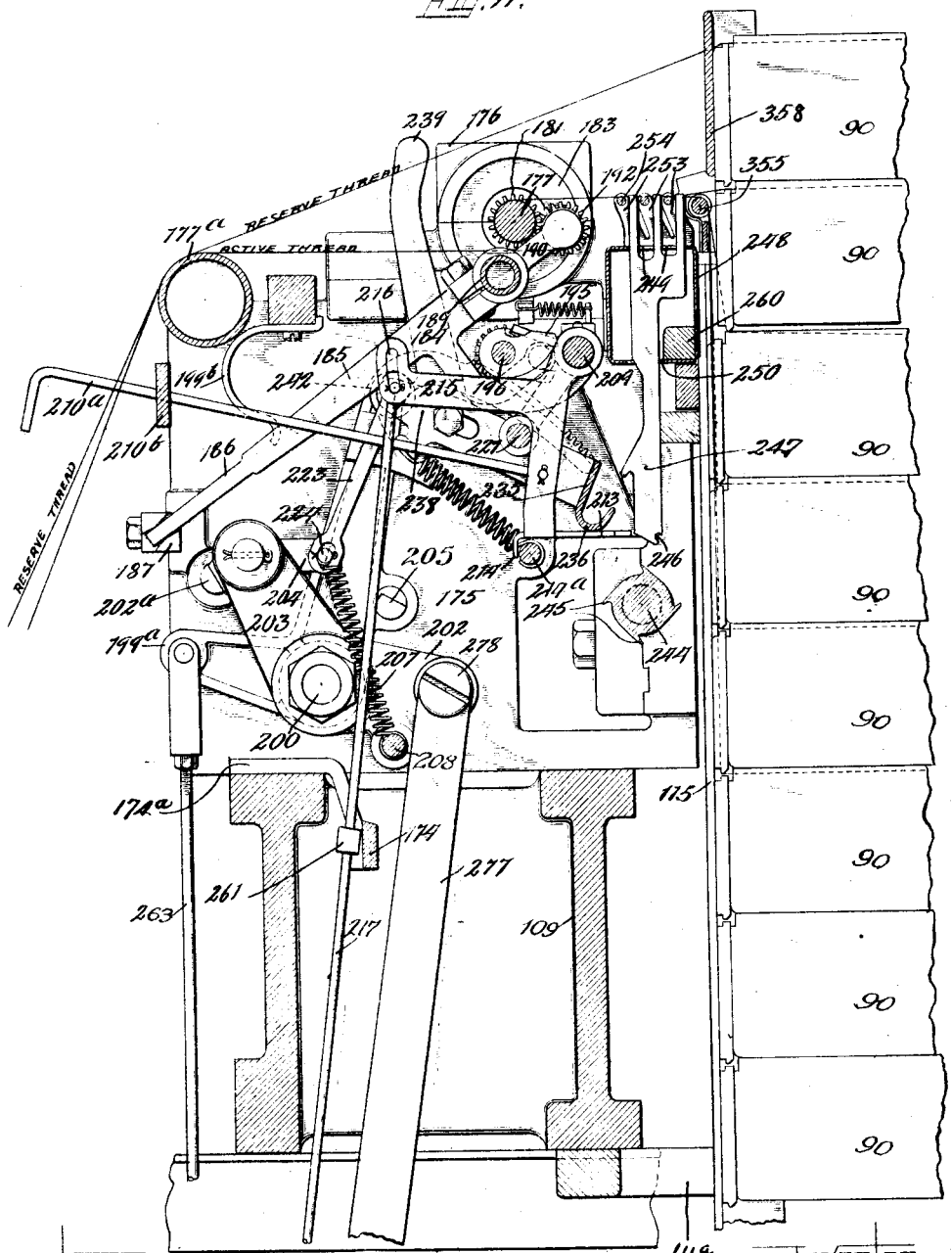

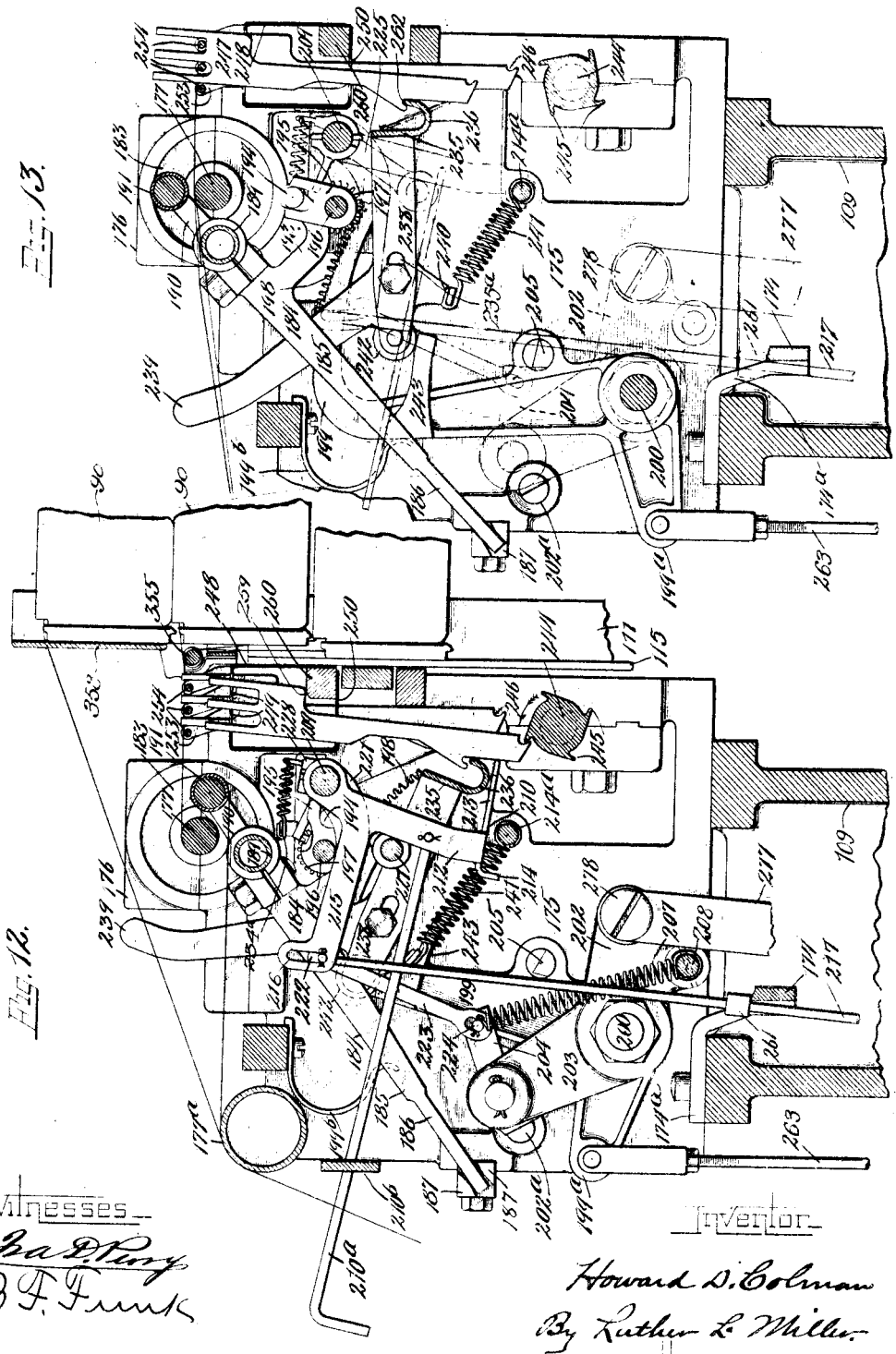

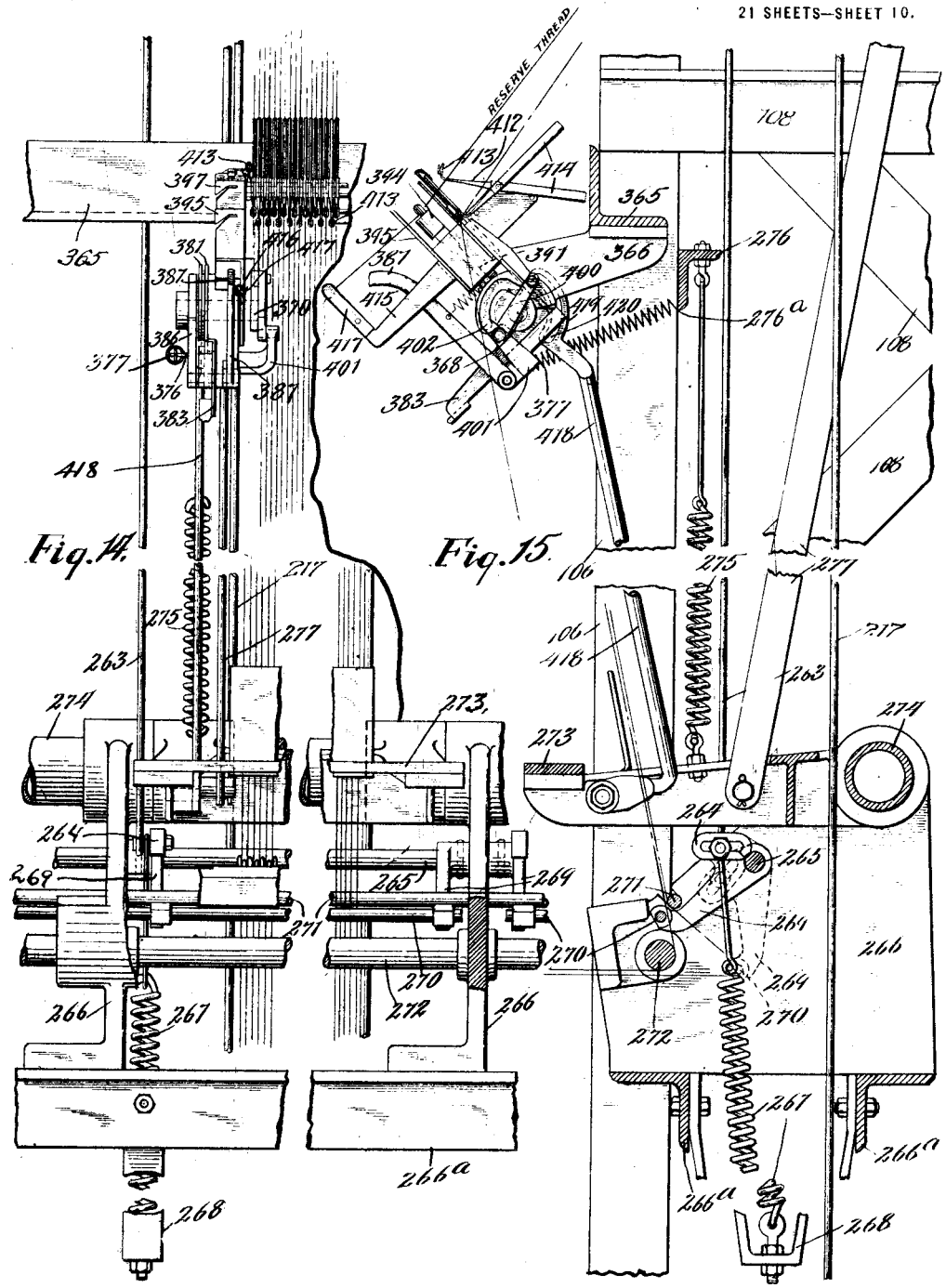

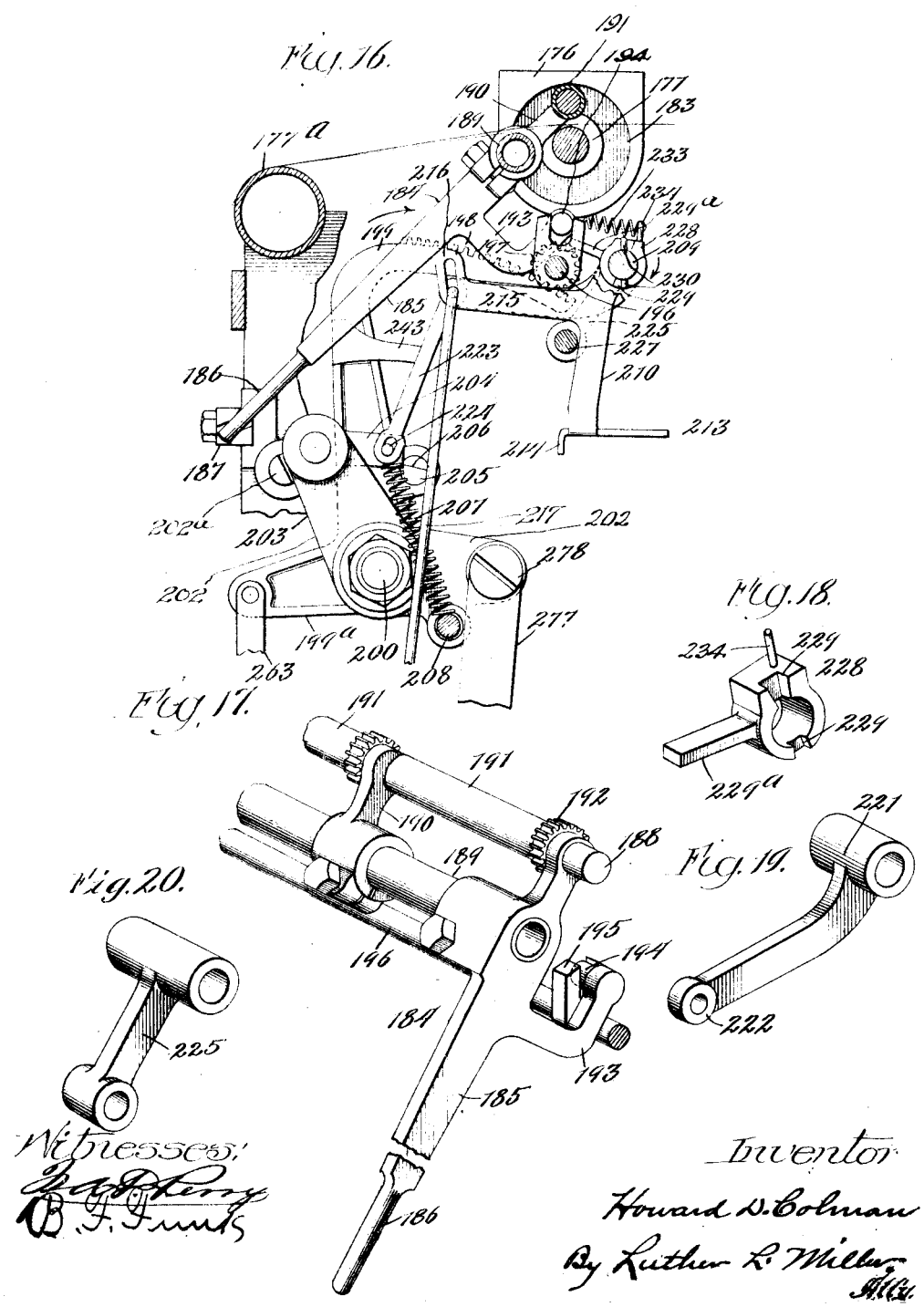

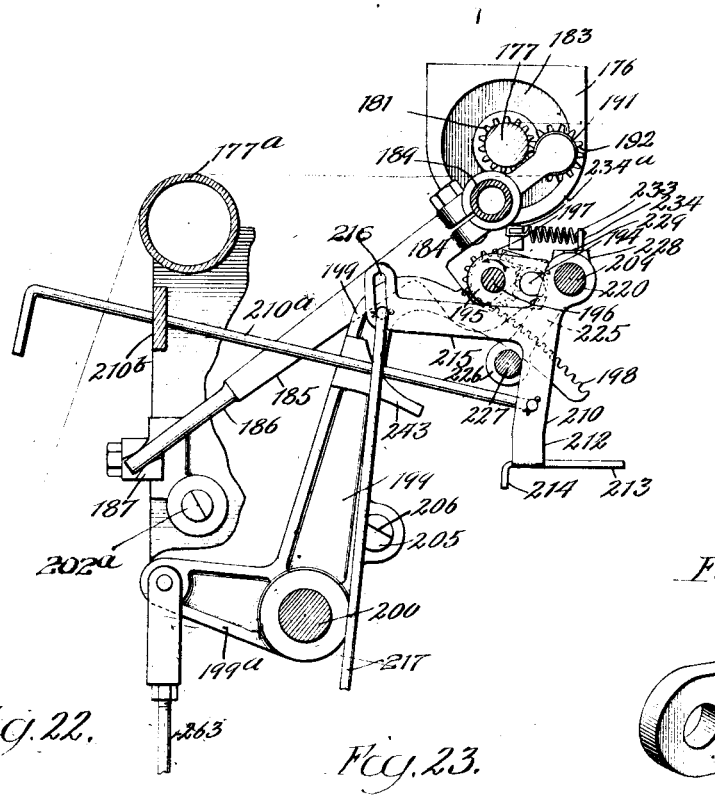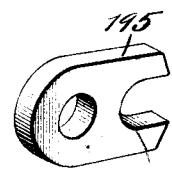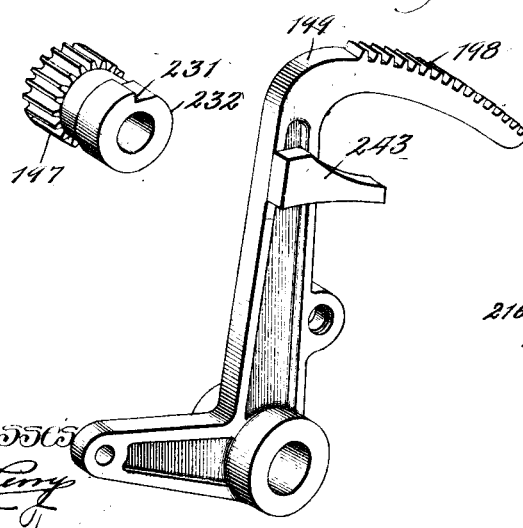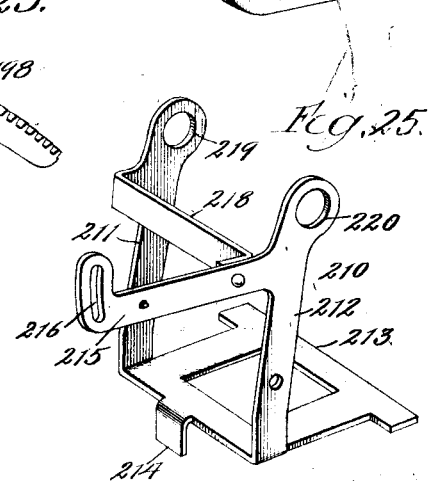

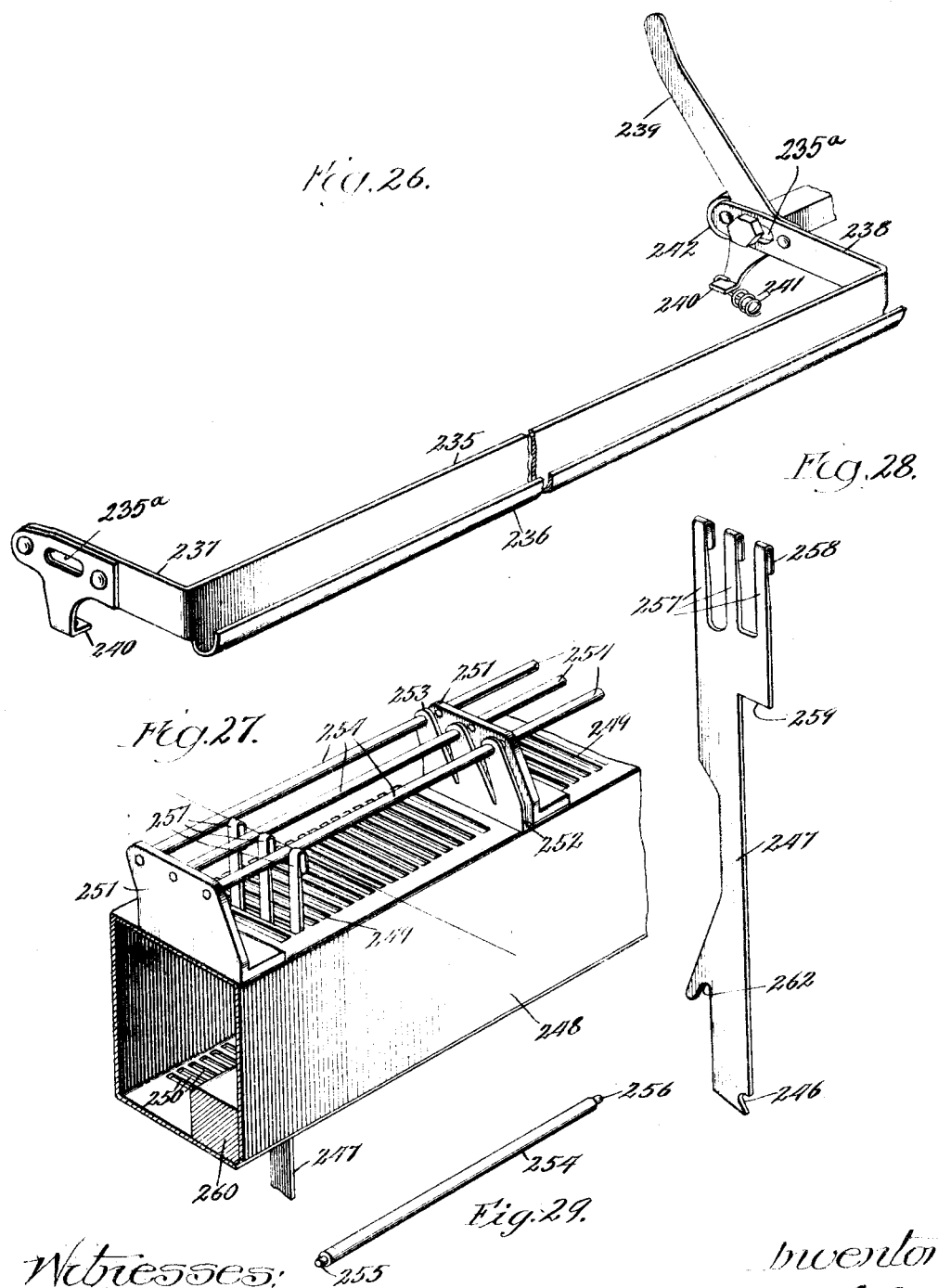

H. D. COLMAN.
WINDER.
APPLICATION FILED APR. 1, 1909.
1,191,102.
Patented July 11, 1916.
21 SHEETS—SHEET 14.
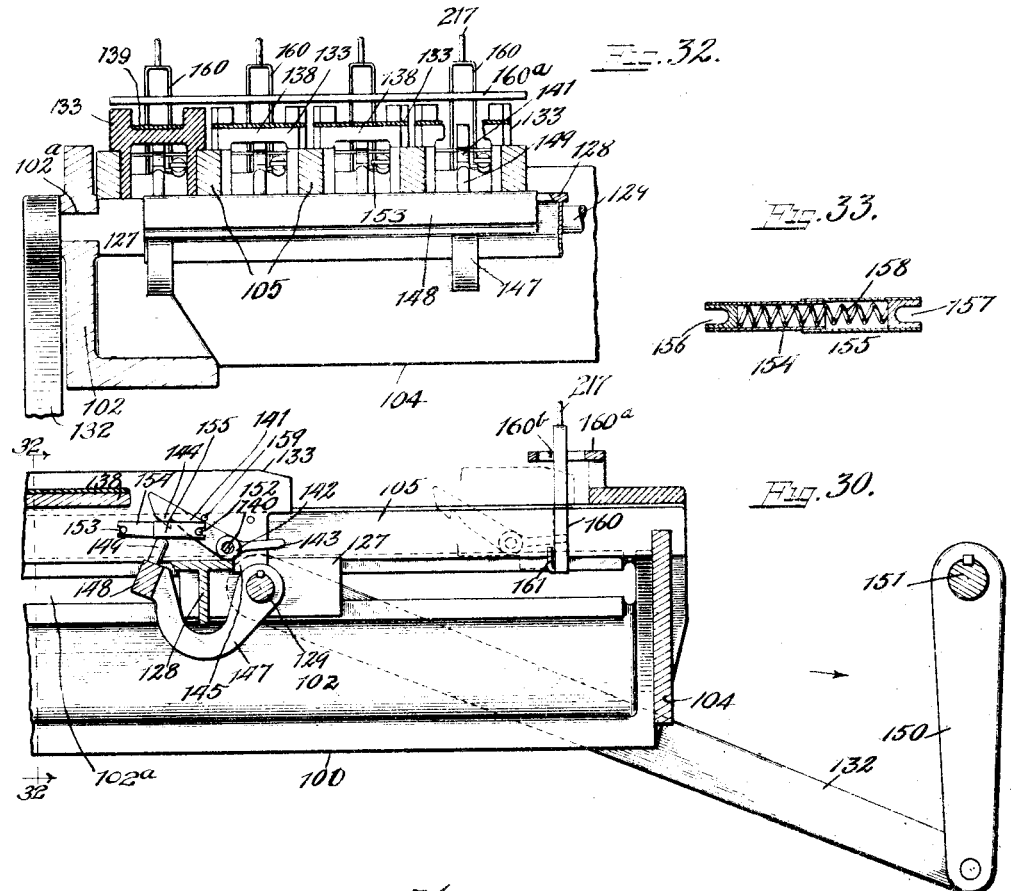
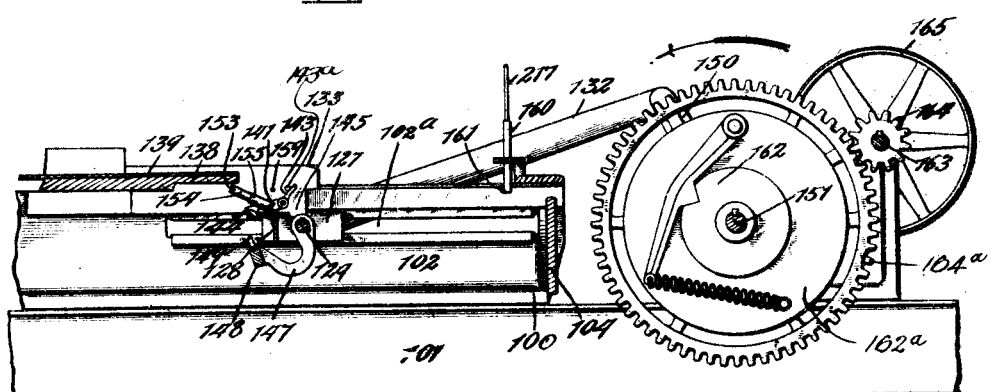

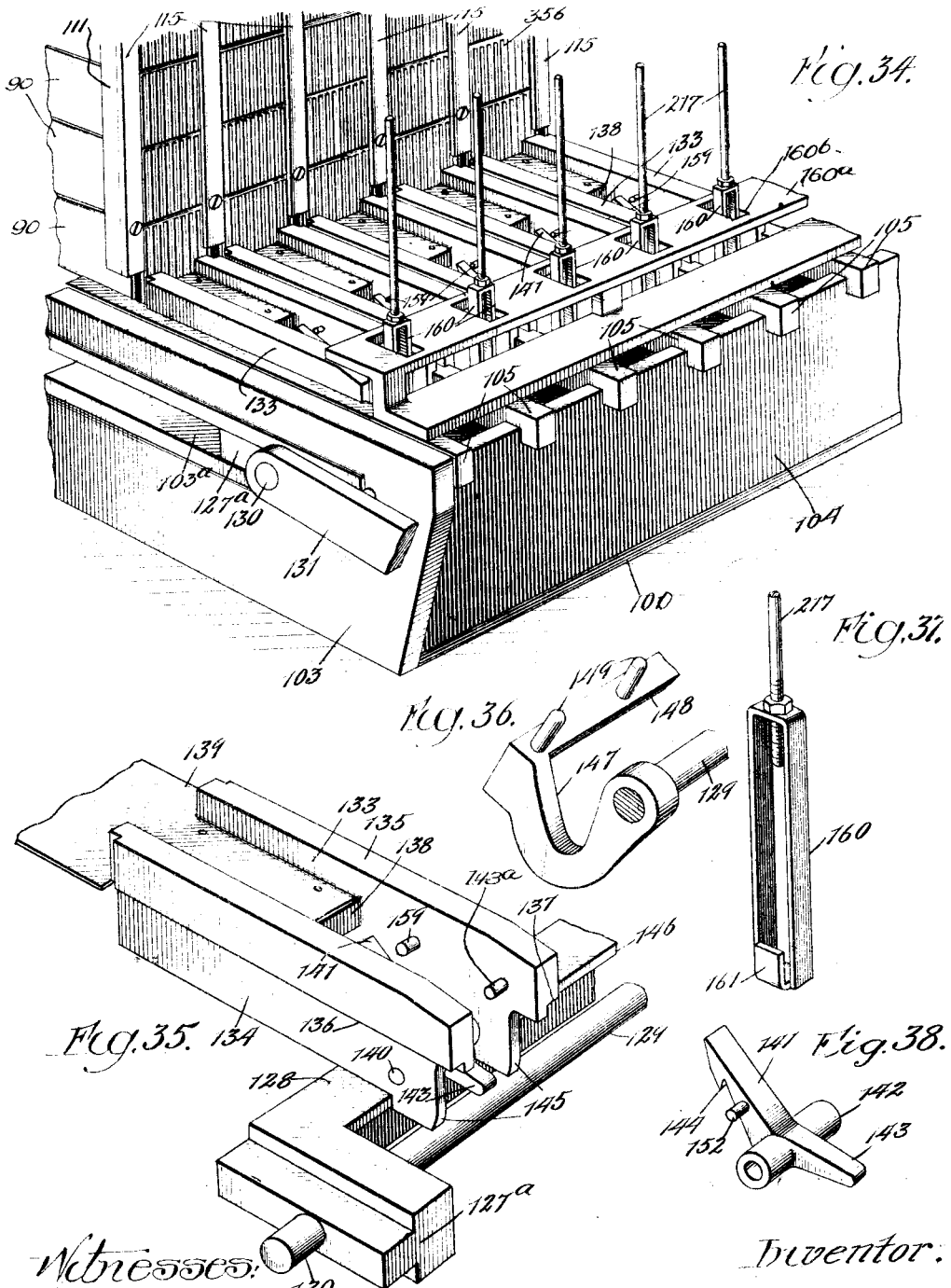

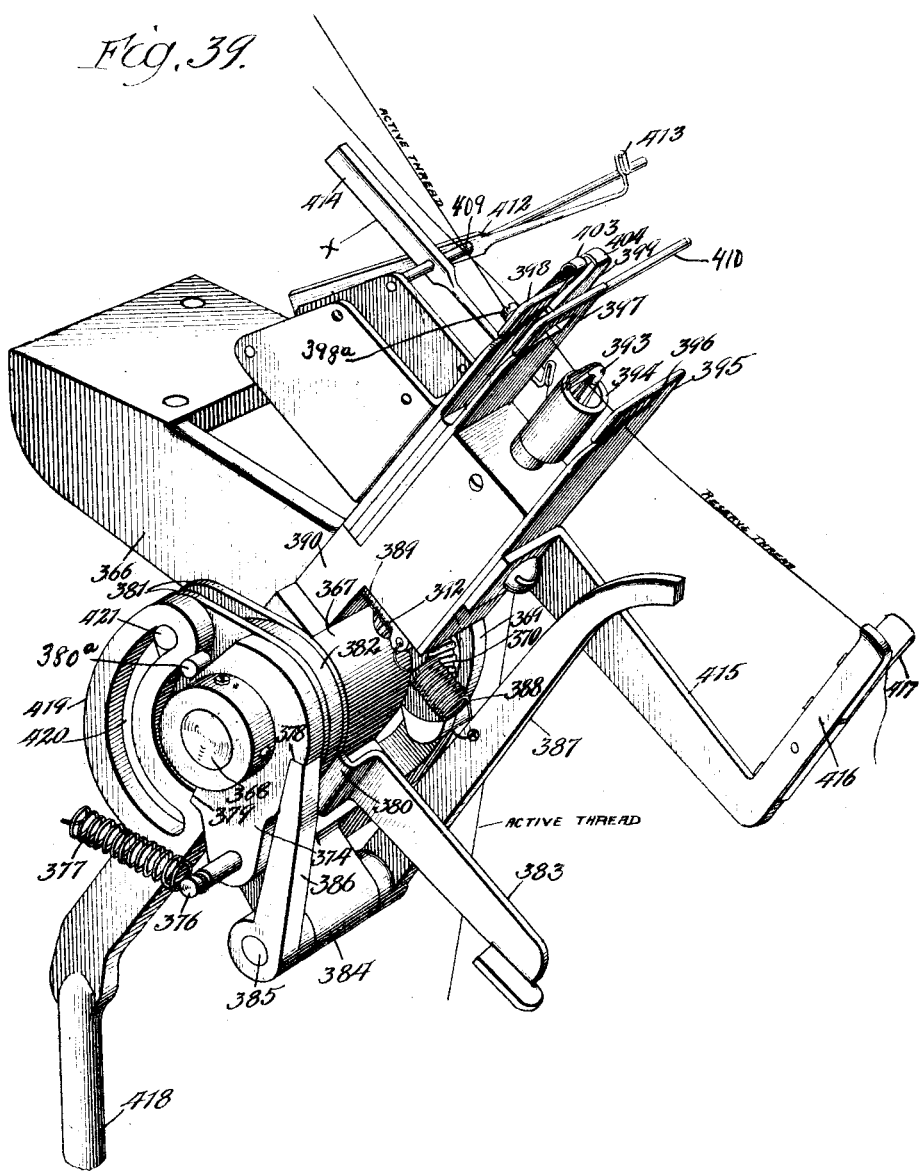

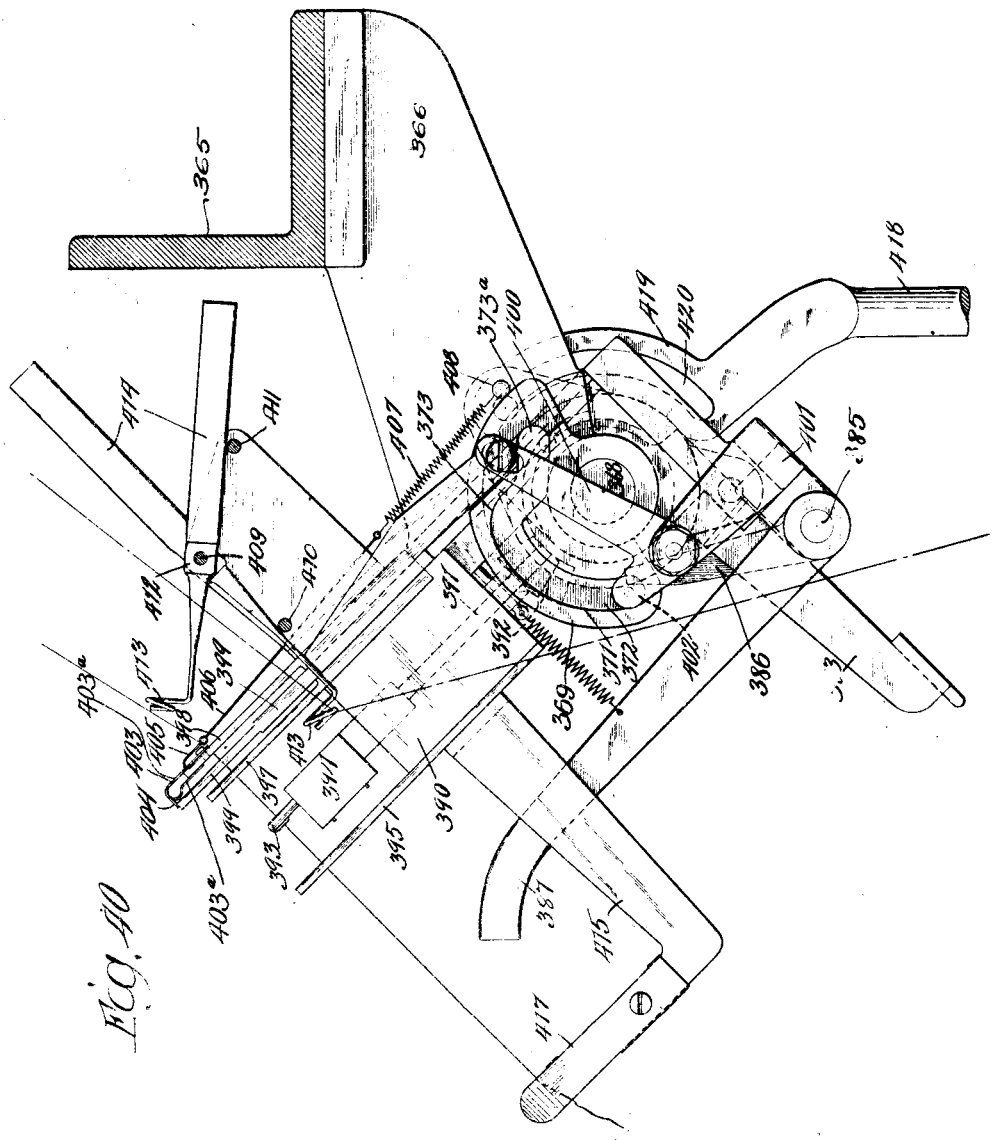

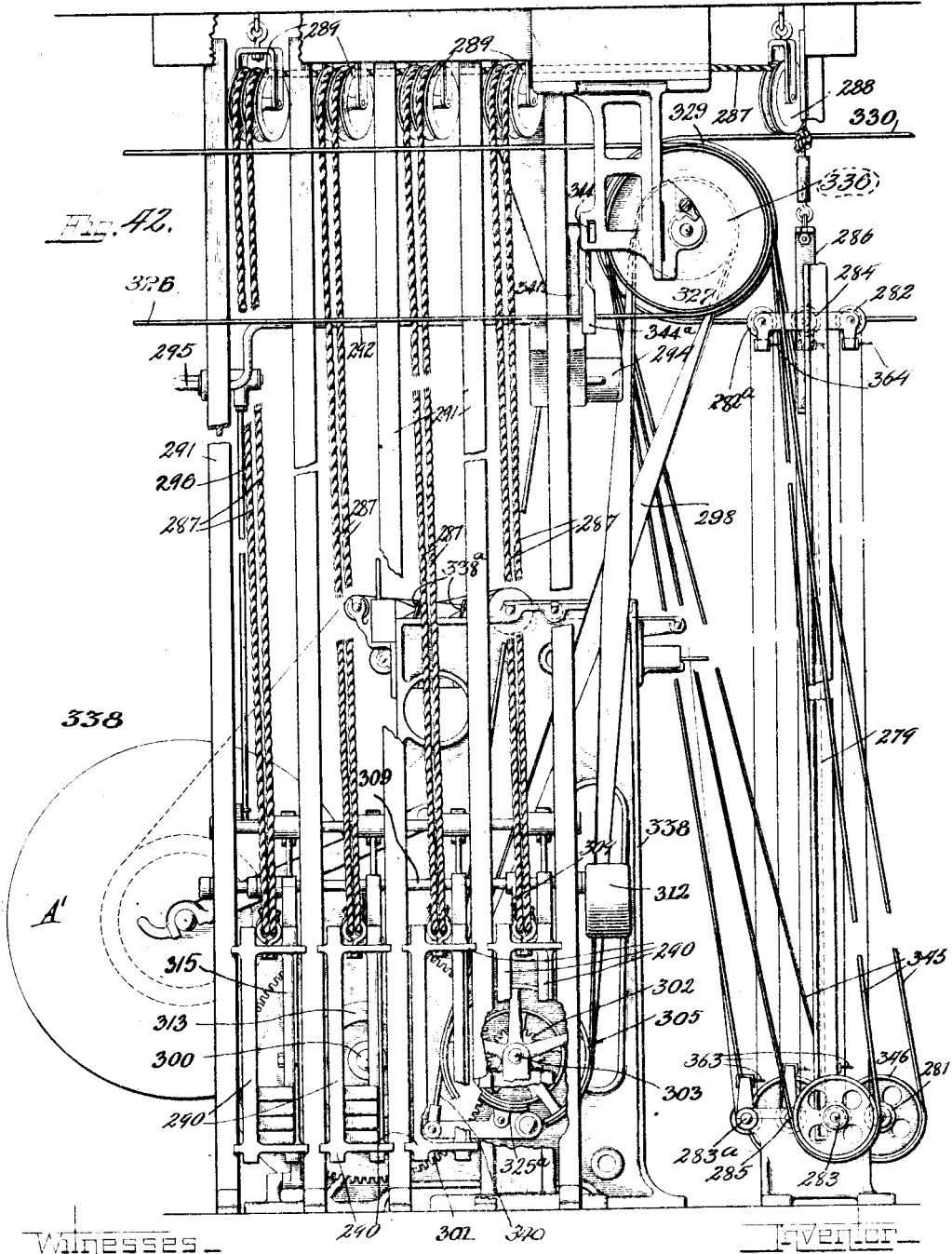

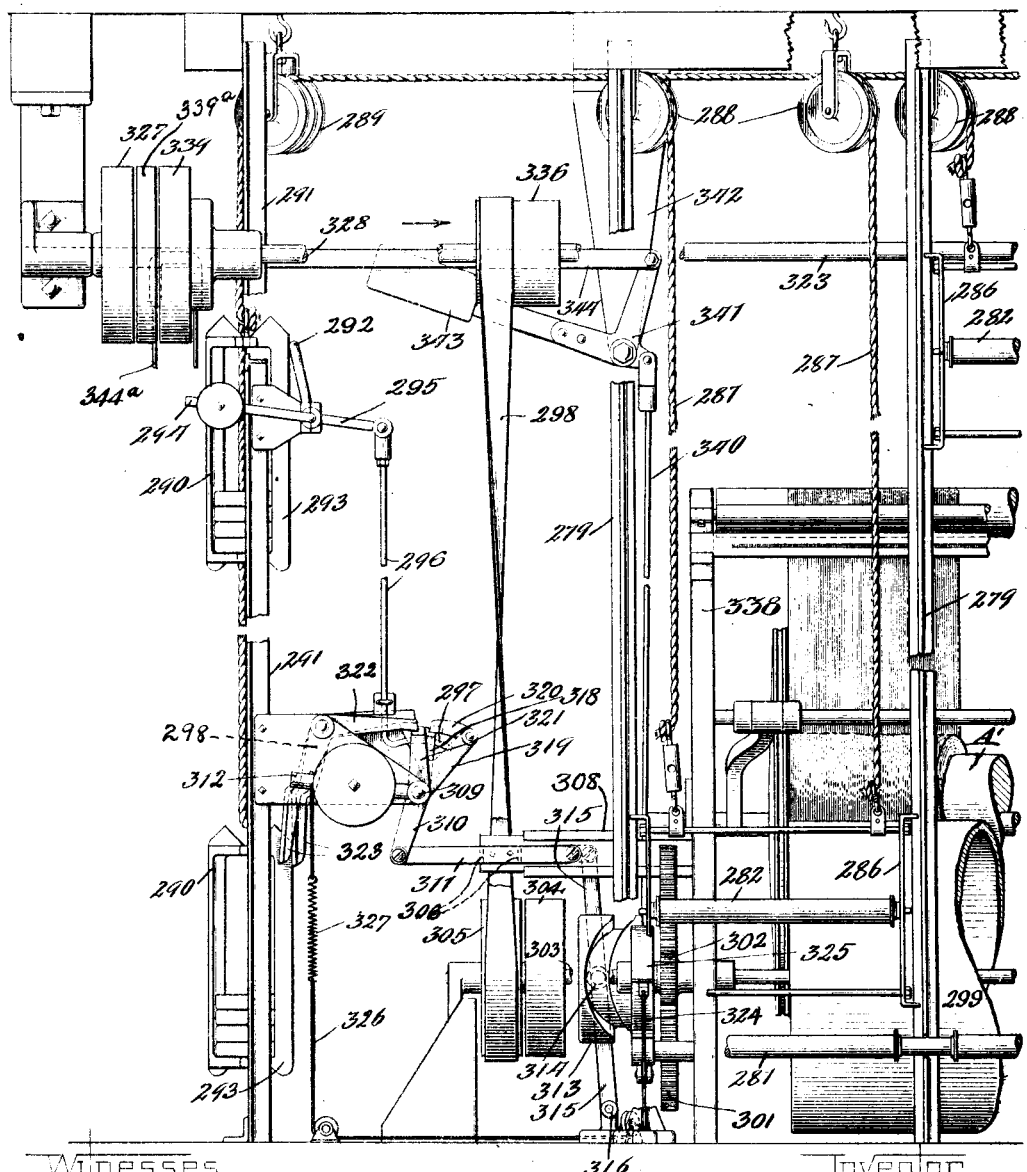

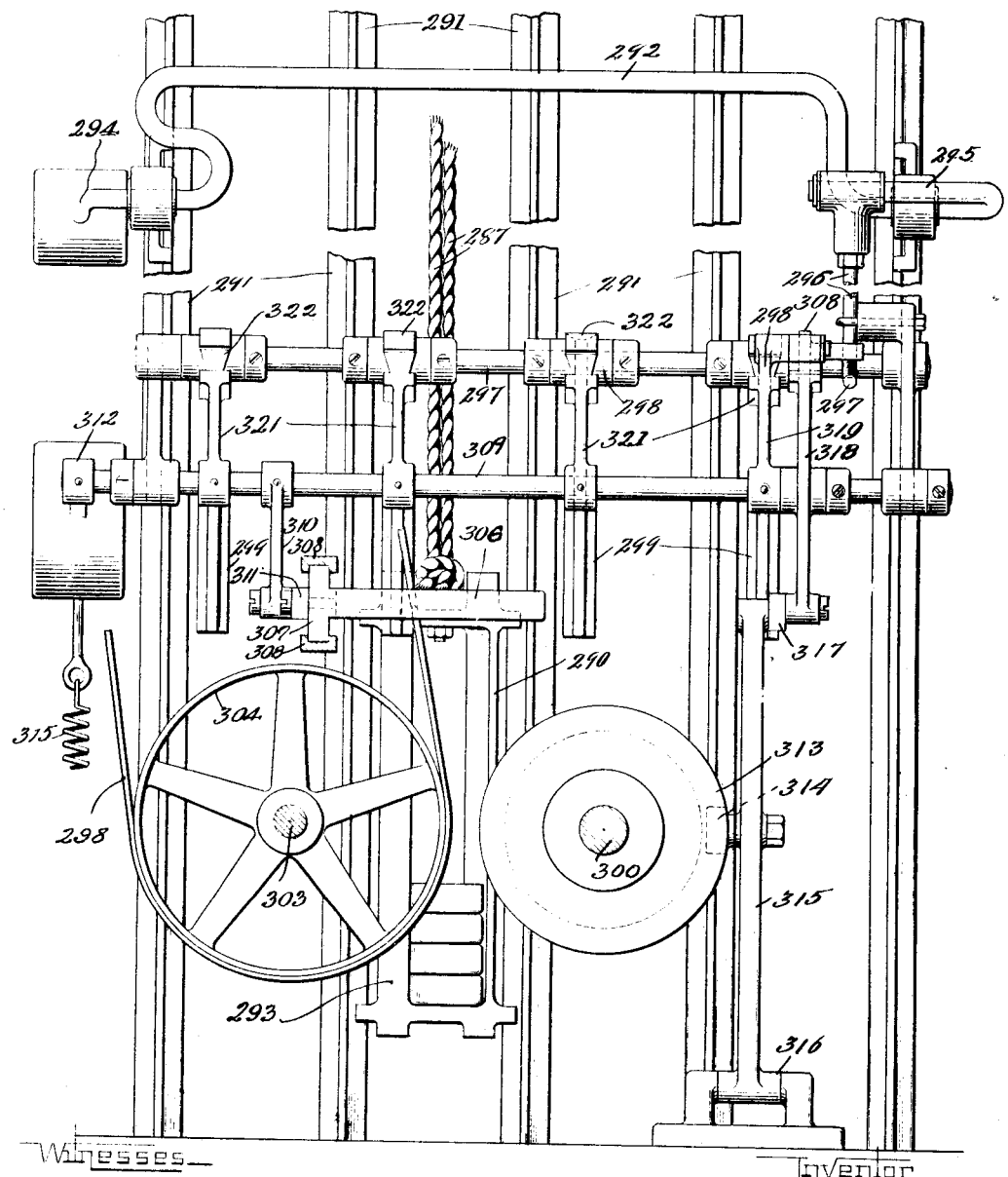

UNITED STATES PATENT OFFICE.

HOWARD D. COLMAN, OF ROCKFORD, ILLINOIS, ASSIGNOR, BY MESNE ASSIGNMENTS, TO HOWARD D. COLMAN, LUTHER L. MILLER, AND HARRY A. SEVERSON, COPARTNERS DOING BUSINESS AS BARBER-COLMAN COMPANY, OF ROCKFORD, ILLINOIS.

WINDER.

1,191,102.   Specification of Letters Patent.   Patented July 11, 1916.

Application filed April 1, 1909. Serial No. 487,347.

*To all whom it may concern:*

Be it known that I, HOWARD D. COLMAN, a citizen of the United States, residing at Rockford, in the county of Winnebago and State of Illinois, have invented certain new and useful Improvements in Winders, of which the following is a specification.

This invention relates to means for rewinding yarn masses, such as those produced upon spinning machines, to form a larger yarn mass, as, for example, a warp wound upon a section beam.

In my application Serial No. 649,080 there is disclosed a machine of the class just mentioned, which machine is provided with automatic means for uniting a reserve thread to any one of the running threads upon exhaustion of the latter, without interrupting the winding of any of the threads.

The object of the present invention, generally stated, is to provide a machine of the specified class, which shall be so organized that non-automatic means may be employed for uniting reserve threads to exhausted threads, and still permit of continuous rotation of the receiving yarn mass.

Figure 9:
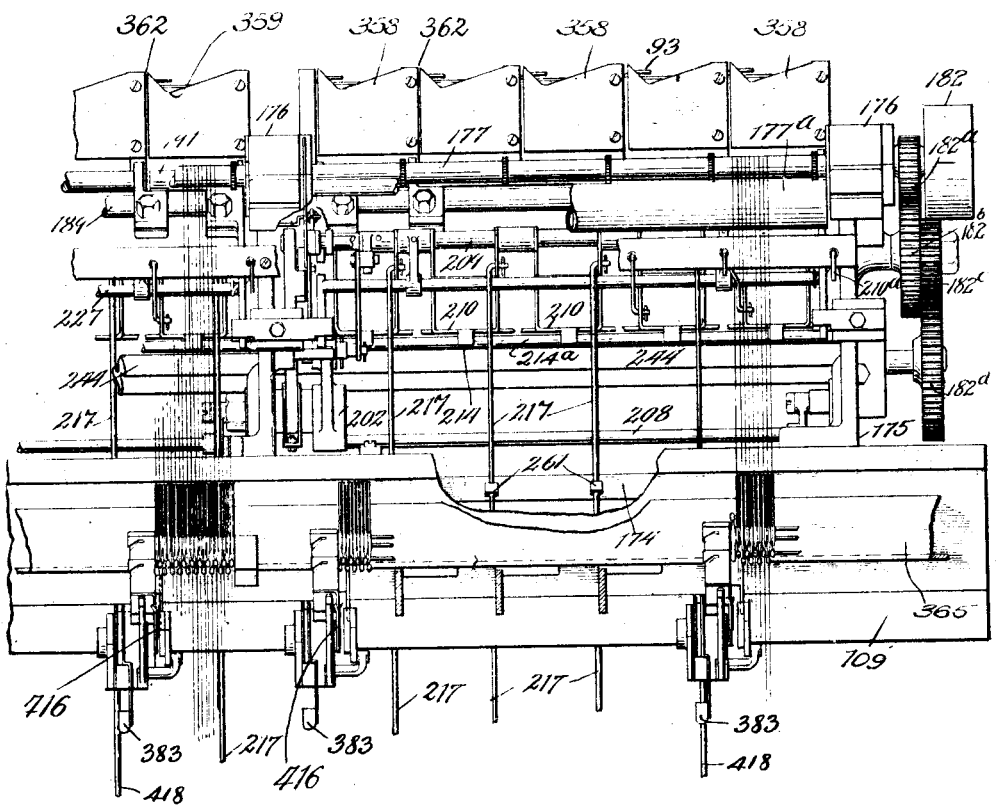
Figure 10:
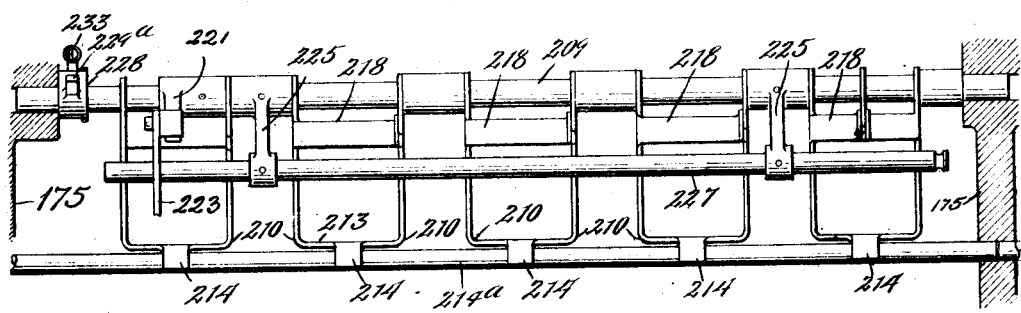
Figure 41:
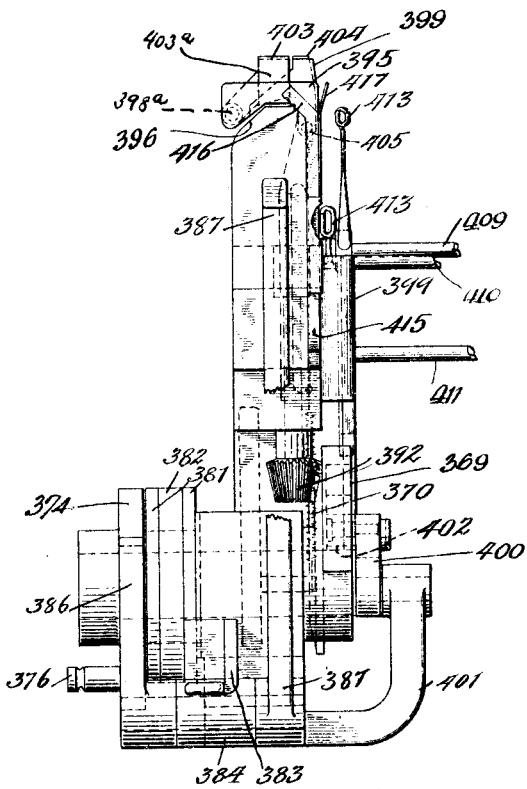

In the accompanying drawing, Figure 1 is a side elevational view of a winding machine constructed in accordance with my invention. Fig. 2 is an enlarged fragmental side elevation of the machine. Fig. 3 is a fragmental plan view of the means for supporting boxes containing bobbins. Fig. 4 is a fragmental vertical face view of certain bobbin-box passages and means for removing bobbins from the boxes. Fig. 5 is a plan view of one of said bobbin boxes. Fig. 6 is a side view of said box. Fig. 6ª is a detail view illustrating a means for removably attaching a yarn guide and clearer to the bobbin box. Fig. 7 is an enlarged plan view of part of the tension-reducing mechanism, the detector mechanism, etc. Fig. 7ª is a fragmental top plan view of a bobbin box, detectors, etc. Fig. 8 is an enlarged fragmental view of said mechanism. Fig. 8ª is a detail view of one of the bearings for the ends of two adjacent tension-reducing sections. Fig. 9 is a front view of a part of the tension-reducing and selector mechanisms, and illustrating some of the knot-tying mechanisms. Fig. 10 is a front view of the tension-reducer throw-out members and the supporting shaft therefor, as well as the rod for limiting the movement of said members in one direction. Fig. 11 is a vertical longitudinal sectional view through the machine, showing the tension-reducing mechanism and a thread leading from one of the bobbin boxes, together with a reserve thread, the detectors and their coöperating mechanism being shown in their normal positions. Fig. 12 is a view of the mechanism shown in Fig. 11, but showing the positions of various parts when a thread is broken and one of the detectors has dropped. Fig. 13 is a view of part of the mechanism shown in Fig. 11, the tension-reducing mechanism being thrown out of operation, and the previously dropped detector being shown as raised. Fig. 14 is a fragmental front view showing the thread-uniting mechanism, a foot lever for restoring the thread-uniting mechanism and the tension-reducing mechanism to operative position, and a slack take-up. Fig. 15 is a side elevation of the mechanism shown in Fig. 14. Fig. 16 is a view of the tension-reducing mechanism, part of the means for restoring it and one of the actuators for causing the tension-reducing rolls to be thrown out of operative position when a thread breaks. Fig. 17 is an enlarged detail perspective view of the movable tension-reducing rolls and the rock shaft for moving them into and out of operative position. Fig. 18 is a perspective view of a latch for locking the tension-reducing rolls in operative position. Fig. 19 is a detail perspective view of a lever for connection with a link which is attached to a latch for preventing the return of the tension-reducing rolls when all the bobbins in a particular section are not connected with the section beam. Fig. 20 is a detail perspective view of one of a plurality of levers for supporting a rod against which the actuator may contact when one of the detectors is down. Fig. 21 is a view of the tension-reducing rolls in operative position, together with part of the coöperating mechanism therefor. Fig. 22 is a detail perspective view of a sleeve having a gear for moving the tension-reducing rolls into operative position. Fig. 23 is a detail perspective view of a lever having a segmental rack for engagement with the gear on the sleeve shown in Fig. 22. Fig. 24 is a detail perspective view of one of the bearing forks for the journals carried by the tension-reducing roll. Fig. 25 is a detail perspective view of one of a plurality of swinging members actuating certain mechanism when a thread breaks. Fig. 26 is a detail perspective view of one of the detector elevators. Fig. 27 is a fragmentary perspective view of part of the detector guide showing the thread-supporting rods and one of the detectors in position. Fig. 28 is a detail perspective view of one of the detectors. Fig. 29 is a perspective view of one of the thread-supporting bars. Fig. 30 is a sectional view through the base of the frame of the machine, showing the bobbin-box-removing mechanism. Fig. 31 is a similar view, on a reduced scale, showing the driving means for said box-removing mechanism. Fig. 32 is a sectional view on the line 32—32 of Fig. 30. Fig. 33 is a longitudinal sectional view through a device for holding the dog shown in Figs. 31 and 32 in or out of engagement with the T-rail beneath it. Fig. 34 is a perspective view of part of the base of the bobbin-box frame, showing the relative positions of the stacks of boxes and the vertical rods for moving the dogs into engagement with the transverse T-rail so as to actuate the slides to move boxes out of said stacks. Fig. 35 is a fragmentary view of the T-rail and one of the slides. Fig. 36 is a fragmentary perspective view of a device for throwing the dogs out of engagement with the T-rail. Fig. 37 is a perspective view of one of the yokes for throwing a dog into engagement with a T-rail. Fig. 38 is a detail perspective view of one of the dogs. Fig. 39 is a detail perspective view of the thread-uniting mechanism. Figs. 40 and 41 are side and front views, respectively, of said mechanism. Fig. 42 is a side view of the warper and a means for providing a reserve supply of yarn between the warper and the knot-tying mechanism. Fig. 43 is another view of the mechanism illustrated in Fig. 42. Fig. 44 is an enlarged view of the mechanism controlled by the rise rolls for stopping and starting the warper.

The embodiment herein shown of my invention comprises a warper A; a structure B for supporting boxes containing bobbins, said structure and boxes constituting a creel; mechanism C for reducing tension upon the yarn extending from the bobbins to the warper, and for detecting exhausted threads; mechanism D for tying new threads to exhausted threads; mechanism E for providing a reserve supply of yarn at a point between the tying mechanism and the warper; and means (part of which is shown at F) for removing from the structure B boxes containing completely or partially unwound bobbins, for removing said bobbins from the boxes thus removed, and for returning the empty boxes to the structure B where they are supplied with full bobbins. In the present machine, each bobbin is contained in a box 90 as shown in Figs. 5 and 6, the upper side of each box being open save for the side flanges 91. At the right-hand side of each box is a yarn guide and clearer 92 to receive the yarn as it comes from the bobbin. Said guide and clearer may be removably secured to the box in order that the former may be readily replaced when worn. Herein the device 92 is shown as secured in place by means of tongues 90ª (Fig. 6ª) struck up from the side wall of the box. . In order that the bobbin may slide longitudinally into the positions where its winds of yarn may pass to the guide 92 with the least resistance, the box 90 is preferably considerably longer than the bobbin, as indicated in Figs. 5 and 6.

For convenience in handling the multiplicity of strands of yarn, I have divided the bobbin-box-supporting structure B into sections. In a machine for winding a 400-thread section beam, the structure B would preferably consist of four sections, each section being adapted to support five stacks of bobbin boxes 90. Each stack consists of any number of boxes suitable for the purpose for which the machine is intended. As shown, each stack comprises a sufficient number of boxes to take care of twenty threads.

The bobbin-box supporting structure B, the mechanism C, and the thread-uniting mechanisms D are supported by a base 100 (Figs. 2 and 34) of any preferred construction. The base herein shown rests upon I-beams 101 (Fig. 1). The base 100 comprises sides 102 and 103 and a front cross bar 104 (Fig. 34) connecting the front ends of said sides 102 and 103. The rear edges of the sides 102 and 103 are joined together by a cross bar similar to the one designated 104. The top of the base 100 is open, but it is provided with a plurality of longitudinal supporting bars 105.

Supported on the floor is a plurality of posts 106 and 107 which are rigidly connected together by braces 108, a girder 109 and the transverse angle irons 110 (Fig. 2).

Each section of the bobbin-box-supporting structure B consists of a skeleton frame as shown in top plan in Fig. 3, the skeleton frames being supported by and rigidly attached to the posts 107. Each skeleton frame may comprise posts 111 secured to the angle irons 110 and the girder 109 by means of the castings 111ª (Fig. 2), posts 112 connected together by the cross bars 113, and connecting bars and braces 114. At the forward side of the frame are vertical strips 115 which form guides for the forward ends of the bobbin-boxes 90·(Figs. 8 and 11).

Between the intermediate posts 111 and 112 are partition plates 116 (Fig. 3) which are at the upper end of the frame, and these plates are for the purpose of guiding the bobbin boxes 90 accurately onto the stacks, but said plates terminate a short distance below the top of the frame, the boxes being thereafter guided or held in position by the strips 115 and the flanges of the angle-iron posts 112.

In rear of each of the skeleton frames just described is a similar frame which is taller than the forward skeleton frame and is shown in Fig. 2 as being supported upon the channels 100ª, which, in turn, are carried by the I-beams 101. Each rear frame comprises vertical plates 116ª carrying curved guides 117 which form sinuous passages or conduits, one for each stack of boxes 90, the lower end of each passage being arranged close to the lower end of a stack. The spaced plates 116ª are connected together by cross bars 118 (Figs. 2 and 3), of which there may be any suitable number both in front and in rear of the plates, and the rear frame sections may be further braced by the braces 119 on the respective sides thereof. The sinuous passages terminate in inclined ways 120 at their upper extremities, formed by bending the guides 117 as shown in Fig. 2, to support the boxes as they are forced through the passages. The inclined ways 120 are in the same plane as, and are alined with, ways or guides 121 which bridge the gap between the front and rear frames. There is a way 121 for each stack of bobbin-boxes.

The passages formed by the guides 117 are open to expose the open sides of the bobbin boxes, and each is provided with a guard plate 122 (Figs. 2 and 4) to prevent the bobbin from falling out of the box until the bobbin has passed said guard plate. The guard plates are pivoted at their lower ends between adjacent plates 116ª, each plate 122 having a bent portion 123 which is adapted to move into and out of the open sides of the bobbin boxes. As the boxes pass the guard plate the bobbins drop upon the end 124 of said guard plate and thence onto a table 125 and into a chute 126, from which chute the bobbins may pass into suitable receptacles provided therefor.

Whenever a thread being unwound from a bobbin exhausts, a box is removed from the lower end of the stack in which the exhaust occurred and pushed into the conduit 117, the remaining boxes in the stack settling in their supporting and guiding framework. The conduit 117 being full of boxes, the entrance of another box displaces the uppermost box, the latter box sliding down the ways 120 and 121 onto the top of the stack. Here it is supplied with a full bobbin in any suitable manner. I have shown a bin *a* (Fig. 1) from which the operator may take a bobbin and deposit it in the box just added to the stack. The mechanism for removing boxes from the respective stacks is best illustrated in Figs. 2 and 30 to 38, inclusive.

In the slots 102ª and 103ª of the base 100 are slides or heads 127 and 127ª (Figs. 2 and 34) of a T-bar 128 (Fig. 35) which extends entirely across the base 100, and projecting through said heads 127 and 127ª is a rock shaft 129. Fixed to the projecting ends 130 of said rock shaft 129 are connecting rods 131 and 132, respectively.

Mounted upon the bars 105 is a plurality of ejector slides 133 (Fig. 35), each of which comprises a casting having sides 134 and 135 formed with shoulders 136 and 137 which rest upon the bars 105. There is a slide 133 for each stack of bobbin boxes. The sides 134 and 135 are connected by a web 138 which extends from the rear of each slide to a point short of the front ends of said sides 134 and 135. On the web 138 is fastened a plate 139 which extends beyond the end of said slide and rests upon the bars 105 over which it slides. The lowermost boxes in the stacks normally rest upon the plates 139.

On the pivot 140 (Fig. 30) carried by the sides 134 and 135 of each ejector is a dog 141 having a hub or barrel 142 loosely mounted on said pivot and provided with a tail piece 143. The tooth 144 of the dog is adapted to engage the flange of the T-bar 128 (Fig. 31) so that when said bar moves forward and the tooth 144 engages its flange the slide 133 will be carried forward with said bar to push out a bobbin box. The sides of the ejectors 133, at their front ends, are provided with tail pieces 145 which are arranged to be engaged by the front edge 146 of the T-bar 128 on the return stroke of said T-bar, for returning the ejectors 133 to the front end of the base 100.

The means for releasing the dogs 141 from the T-bar 128 comprises crank arms 147 fixed on the shaft 129, to the outer ends of which crank arms is connected a transverse bar 148 having a plurality of upstanding pins or projections 149 thereon adapted to contact with the under sides of the dogs 141. In view of the fact that the crank arms 147 are fast on the same shaft as the connecting rods 131 and 132, which rods are in pivotal connection with the cranks 150 on the drive shaft 151, it follows that every time the shaft 151 is rotated to slide the T-bar 128, the shaft 129 will rock. During the movement of the T-bar in the direction indicated in Fig. 31 the pins 149 will be out of contact with the dogs 141, but at the end of said movement and upon the return movement the pins 149 will raise any dogs that may be in engagement with the T-bar. A dog retainer, shown in Fig. 33, is provided to hold each dog 141 in either engaging or disengaged position. The retainer comprises two telescoping tube-sections designated by the reference numerals 154 and 155, respectively. The section 154 has a fork 156 engaging a pin 153 on the ejector, while the section 155 is provided with a fork 157 engaging a pin 152 on the dog. Interposed between the tube-sections and incased therein is an expansion spring 158. The dog retainer will hold the dog in either an operative or inoperative position, the pressure exerted by the retainer being on one side or the other of dead center. The upward movement of the dog 141 may be limited by a pin 159, while the downward movement of the dog is limited by the engagement of the tail 143 with a stop pin 143$^a$. When the pins 149 on the bar 148 contact with the under sides of the dogs, the latter will be moved out of engagement with the T-bar 128, in which position they will be held by the retainers until they are mechanically thrown into position to be engaged by said T-bar. Fig. 37 is a perspective view of a yoke 160, of which there is one for each dog 141. 160$^a$ (Fig. 34) is a fixed guide bar for the yoke 160, said yokes extending through openings 160$^b$ in said bar. Each yoke has an upstanding lip 161 adapted to lie beneath the tail piece 143 of the dog 141 so that when the yoke 160 is raised, the dog will be thrown into position for engagement by the T-bar. As heretofore stated, the yoke 160 is raised to throw the dog into contact with the T-bar, and after having been raised, said yoke is sometimes temporarily held elevated. The lip 161 is provided as a guard so that in the event that the yoke is up when the dog returns, the tail piece 143 of said dog will be prevented from moving under the yoke, and will merely contact with the lip 161 to push the yoke out of the way until such time as it is released to drop into proper position to permit the lip 161 to swing under the tail piece 143. The means for moving the yokes 160 will be described hereinafter.

The drive shaft 151 is provided with a slip clutch 162 (Fig. 31) of known construction, which will permit the clutch element 162$^a$ to rotate without rotating the shaft 151 in the event that any parts of the machine happen to clog, as, for example, if boxes become jammed. Under ordinary conditions, however, the shaft 151 will be driven by the clutch 162 and from a drive shaft 163 having a pinion 164 thereon which meshes with the spur gear 164$^a$. The shaft 163 may be driven by a suitable belt on a pulley 165.

Posts 170 (Figs. 1 and 2) are connected to the posts 106 and 107 by the side bars 171, and these side bars 171 support a platform 172 upon which the operator may stand. The posts 170 extend beyond the platform and their upper ends may be connected by a guard rail 173.

Each section of the structure B is provided with mechanism for reducing the tension placed upon the yarn by the drag of the bobbins, the tension-reducing mechanism of each section operating independently of the other tension-reducing mechanisms.

Supported upon the box girder 109 (Fig. 2) are housings 175 for the tension-reducing rolls, etc. This mechanism is best illustrated in Figs. 7 to 13, inclusive. Each housing is provided with a bracket 176 (Fig. 8$^a$) in which is supported one end of each adjacent section of a shaft 177. Each intermediate shaft-section is provided on one end with a coupling head 178 provided with a groove 179 therein. The opposite end of the section has a tongue 180 fitting in the groove 179 in the head 178 of the adjacent shaft-section. Thus, it will be seen that in effect a continuous shaft is formed which runs entirely across the machine. Each shaft-section is provided with five gears 181.

The shaft formed by the sections 177 constitutes one of the tension-reducing rolls. It is driven from a pulley 182 (Figs. 1 and 9) on the end of the shaft-section projecting from one side of the machine. Each bracket 176 is also provided with annular grooves 183 on its sides, which grooves constitute bearings for a shiftable roll-supporting bracket 184 (Figs. 8 and 17), one for each section of the structure B. Each of the brackets 184 comprises two arms 185 having portions 186 to slide in forks 187 fixed to the housings 175 (Figs. 8 and 16). The arms 185 are provided with trunnions 188 to engage the annular bearings 183. Said arms are rigidly connected by a transverse tube 189.

Fixed to the tube 189 is a plurality of brackets 190. These brackets, together with the upper ends of the arms 185 support rolls 191 which are loosely mounted on spindles on said arms and brackets and which are provided with gears 192 meshing with the gears 181 on the shaft section 177. The rolls 191 are each supported at one end as shown in Fig. 7. The arms 185 are provided with elbows 193 having inwardly projecting fingers 194 which engage forks 195 fixed on a rock shaft 196, said shaft being supported in bearings in adjacent housing 175. The rock shaft 196 for each section is provided with a pinion 197 (Figs. 12, 13 and 21) meshing with a segment 198 on a bell crank 199, said bell crank being rotatably mounted on a stub shaft 200 on one of the housings 175 for each section. When the bell crank 199 is rocked the pinion 197 will cause its shaft to rock so as to impart a swinging motion to the forks 195, thereby causing the trunnions 188 to move in their circular bearings 183 to carry the rolls 191 into inoperative position as shown in Fig. 16 or into operative position as shown in Fig. 21. The bell crank 199 is arranged to contact a buffer 199ᵇ when moved from right to left (Figs. 12 and 13).

As shown in Fig. 12, the tension-reducing rolls form loops in the active threads and by their rotation exert a forward friction on the threads. In practice, the surface speed of the rolls 177 and 191 is or may be considerably greater than the speed of the yarn. Said rolls do not positively feed the yarn, but merely serve to reduce the tension caused by the drag of the bobbins.

Mounted on the shaft 200 (Fig. 12) is a bell crank 202, to the arm 203 of which is pivoted a dog 204 adapted, under certain conditions, to engage a shoulder of a projection 205 (see Fig. 16) having a flat face 206 over which the dog 204 is adapted to slide when moved out of engaging position with the shoulder on said projection. The bell crank 202 is arranged to contact with a stop pin 202ᵃ to limit its movement in one direction (see Figs. 12 and 13).

A spring 207 connected at one end to the dog 204 and at its other end to a rod 208 on the bell crank 202, tends to move the dog 204 into engagement with the projection 205. The rod 208 is carried by the bell crank 202 and by an arm 208ᵃ (Fig. 7) pivoted on one of the housings 175.

209 (Fig. 10) designates a rock shaft in the housings 175, and this rock shaft carries five actuating members 210 (Fig. 25) of bail form. Said actuating members comprise the side arms 211 and 212 connected to a foot piece 213. The foot piece is provided with a depending projection 214 and one of the sides of the actuator has a laterally extending arm 215 having a slot 216 therein. A rod 217 is connected at its upper end to the arm 215 by means of a pin extending through the slot 216, a yoke 160 being connected to the lower end of said rod. (See Figs. 34 and 37). The other arm 211 of the actuator is connected to the arm 215 by a brace 218. If desired, these members may be stamped from a single piece of metal and shaped up to form as shown in Fig. 25. The said arms 211 and 212 of the members 210 are provided with openings 219 and 220 which loosely engage the shaft 209. 210ᵃ (Fig. 21) are rods slidable in the bar 210ᵇ and each connected to one of the actuators 210, whereby the actuators may be manually operated.

214ᵃ (Figs. 10 and 11) is a rod arranged to be engaged by the projections 214 for limiting the pivotal movement of the members 210 in one direction.

Rigid on the shaft 209 is an arm 221 (Figs. 7, 12 and 19), one end 222 of which carries a link 223 which is in engagement with a pin 224 on the dog 204; thus, when the shaft 209 is rocked in one direction the dog 204 is raised so that it will not engage the projection 205 on the bell crank 199, so even when the bell crank 202 is rocked, no movement will be imparted to the bell crank 199.

225 (Figs. 10 and 20) designates hangers rigid on the shaft 209, and these hangers support a transverse rod 227 which extends in front of the actuating members 210 so that when said actuating members are moved in the direction of the arrow (see Fig. 16), they will contact with rod 227 and thereby rock the shaft 209.

Loosely mounted on the shaft 209 is a latch 228 (Figs. 10 and 18) in which are notches 229 to receive a pin 230 carried by the shaft 209, said pin engaging the latch 228 to raise the latch tongue 229ᵃ when the shaft is rocked in the direction of the arrow, Fig. 16. The latch tongue 229 normally engages a shoulder 231 (Fig. 22) on the sleeve 232 which carries the gear 197 rigid on the shaft 196. A spring 233 fixed to a pin 234 on the latch 228 and to an anchor pin 234ᵃ on one of the housings 175 has a tendency to throw the latch tongue 229ᵃ into engagement with said shoulder 231.

235 (Figs. 13 and 26) is a detector lifting bar having a curved lip 236 running the entire length thereof, said bar extending the entire width of one of the sections. The respective ends of the bar 235 are provided with lateral arms 237 and 238 which are pivotally and slidably supported in the housings 175 by means of pivots extending through slots 235ᵃ in said arms. The arm 238 carries a handle 239 which extends upwardly beyond the upper edge of one of the housings and its lower end terminates in a depending projection having a lug 240 to which is connected one end of a tension spring 241, the other end of said spring being connected to the rod 214ᵃ (Fig. 11). The arm 238 also carries an anti-friction roller 242 adapted to ride upon a cam 243 on the bell crank 199 (Figs. 13 and 23). The spring 241 tends to force the curved lip upwardly to engage and lift a fallen detector, but this may be prevented, under certain conditions, by the cam 243 (see Fig. 12). The housings 175 also carry a rotatable roll 244 having teeth or ribs 245 running lengthwise thereof, the rolls of the different sections being connected in any suitable way so as to rotate together. The rolls 244 are constantly rotated by means of the gear train 182ᵃ, 182ᵇ, 182ᶜ, 182ᵈ (Figs. 2 and 9), the gear 182ᵃ being fixed on the shaft carrying the pulley 182. The teeth or ribs 245 are adapted to engage the notches 246 in the detectors 247 (Fig. 28). These detectors are guided in a box 248, best shown in Fig. 27, and which may be formed by bending a piece of sheet metal to form two sides, a top and a bottom, with the top and bottom slotted to form upper guide slots 249 and lower guide slots 250. The number of slots in the top corresponds with those in the bottom and the number is sufficient to receive a detector 247 (Fig. 28) for each thread in the section (in the present instance, one hundred threads). On the top of the guide box 248 are five sets of brackets 251 and 252. The bracket 251 is of rigid material while the bracket 252 may be provided with a plurality of spring fingers 253 whereby the supporting rods 254, having reduced ends 255 and 256, may be moved into and out of engagement with openings in the bracket 251 and the fingers 253. The detectors 247 have forked upper ends, that is to say, each detector may have a fork comprising the fingers 257, there being three fingers in the detector illustrated in Fig. 28. The ends of the fingers 257 are bent back upon themselves to form thread-engaging portions 258 which may be hung upon the active thread passing from the bobbin to the section beam. The hooks 258 are located on the left-hand sides of the detectors.

By reference to Fig. 11 it will be observed that the thread passes over and rests upon the rods 254, and that the fingers 257 of the detector 247 alternate with said rods 254 and are held against dropping by means of the active thread. When the thread breaks or is unwound from its bobbin, and the free end has passed the detector, said detector will drop to the position shown in Fig. 12 so that its shoulder 259 will strike against the shoulder or rest 260 carried by the housings 175. When a detector drops to the position occupied by the fallen one in Fig. 12, one of the ribs of the continuously rotating fluted roll 244 will strike against the notched portion 246 of the detector and throw said detector over against the plate 213 of the adjacent actuating member 210, thus rocking said member. When a member 210 is rocked on its shaft, its arm 215 will be raised so as to raise the rod 217, on the lower end of which is a yoke 160; and as the yoke 160 is raised, the corresponding dog 141 will be caused to move into position for engagement by the T-bar 128, locking an ejector 133 to said T-bar. The ejector in its initial movement will force a bobbin box from the stack with which it alines and cause another box to slide onto the top of the stack.

The rod 217 carries a collar 261 (Fig. 12) which, when said rod 217 is in its elevated position, rests upon the edge of a bar 174 carried by brackets 174ª on the girder 109, and said collar will remain seated until knocked off by the rod 208 upon movement of the lever 202.

As shown in Figs. 2 and 15, the running or active threads of each section extend from the rolls 177 and 191 to a guide roll 177ª, thence past the knot-tying mechanism to a roll 272.

271 is a rod located adjacent to the course taken by the threads when running.

In order to take up the slack formed in the threads by the change of position of the rolls 191 when the section is stopped, I provide the mechanism to be next described. The arm 199ª of the bell crank 199 is connected by means of a link 263 (Figs. 13, 14 and 15) to an arm 264 on a rock shaft 265, said shaft being supported in bearings in brackets 266 carried by the platform support. A tension spring 267 is also connected to said arm and to a yoke 268 fast to the angles 266ª so as to have a down pull on the link 263 and swing the bell crank 199 on its shaft and rotate the gear 197. Depending arms 269 are carried by the shaft 265. These depending arms support a transverse rod 270 which serves as a slack take-up when a downward movement is imparted to the link 263. Whenever a section is stopped and the link 263 is moved downward, the arms 269 swing on the shaft 265 (as shown in dotted lines in Fig. 15) so as to cause the rod 270 to take up the slack occasioned by the change of position of the rolls 191, the threads being carried against the stationary rod 271. The rods 270 and 271, when in contact with the threads, place additional drag thereon. When the bell crank 199 is swung back to normal position, however, the link 263 is raised, the arms 269 moved into the position shown in full lines in Fig. 15, and the slack take-up rod 270 thus moved out of engagement with the threads. The roll 272 might be driven so as to obviate friction upon the threads, in which case the rod 270 would have the additional function of taking the threads off said roll when the tension-reducing rolls were thrown out of operation, thereby putting a drag on said threads in place of a forward friction as in the normal operation of the machine.

The bell crank 199 is moved back into normal position by a treadle or pedal 273 which rocks on a journal 274 in the brackets 266. A spring 275 is connected to the treadle and to the angle 276 on the frame which carries the tension-reducing mechanism. When the operator depresses the treadle 273, a down movement will be imparted to the link 277 which is connected to the bell crank 202 at 278. As the bell crank 202 carries the dog 204, said dog 204 will be caused to engage the projection 205 unless a detector is down, and movement will be given to the segment 198 in the direction of the arrow shown in Fig. 16, imparting a movement to the forks 195 from right to left (see Fig. 16) to move the tension-reducing rolls from the position shown in Fig. 16 to the position shown in Fig. 12. As soon as the rolls have assumed the position shown in Fig. 12, the latch tongue 229ª will drop into the notch or shoulder 231 in the hub 232 of the pinion 197 and said rolls will be held in such position until the shaft 209 is again rocked to lift the tongue 229ª out of the notch 231.

Immediately in the rear of the bars 254, is a grooved thread-guiding roll 355 (Figs. 7 and 11) carried by the housings 175. The roll 355 in this instance has one hundred grooves therein, arranged in five groups of twenty each. Each of the bobbin boxes 90 has in one end twenty grooves 356 (Figs. 5 and 8). It will be understood that as the boxes in a stack settle, the active thread will come from various points in the height of the stack. The object of providing the grooves in the rolls 355 and the bobbin boxes is to maintain the threads properly spaced irrespective of the boxes from which they come, thereby preventing a thread from one box crossing a thread from another box and preventing threads from touching one another. By reference to Figs. 8 and 34 it will be observed that the grooves of one box are in alinement with those of preceding and succeeding boxes, forming continuous individual passageways for the threads.

The detectors 247, the grooves in the roll 355, the grooves in the bobbin-boxes, and the yarn guides 92 are so located with reference to one another that a thread in passing from its guide 92 to its detector will extend through its proper groove in the roll 355 and, when the box settles in the stack, will automatically enter the proper groove in the box next above. See Figs. 7ª and 11.

Fixed to each section of the bobbin-box-supporting structure B is a row of five guide plates 358 (Figs. 9 and 12) located in front of the spaces occupied by the top bobbin-boxes and each having a notch 359 formed therein to facilitate the operation of placing a thread from a bobbin in the top box of a stack beneath a hook 93 on the bobbin-box and into a space 362 occurring at the left-hand side of each plate 358, through which space said thread passes. The threads extending from the top boxes will be herein termed reserve threads.

When a thread becomes exhausted, the free end thereof may be tied to a reserve thread by a manual operation, or by means of the hand implements commonly used in textile mills for tying knots or by means of one of the knot-tying mechanisms herein shown. The thread-uniting mechanism, of which there is one for each stack of bobbin boxes, or in the present machine twenty in all, are shown as being carried by an angle bar 365 on the post or standards 106 (Figs. 9 and 15). The mechanism for uniting the yarn is carried by a bracket 366 secured to said angle bar 365. The bracket 366 is provided with a bearing 367 (Fig. 39) in which is journaled a rock shaft 368. On one end of the rock shaft 368 is fixed a segment 369 on the inner face of which are gear teeth 370 and on the outer face of which is a cam groove 371 (Fig. 40). The cam groove includes a dwell portion 372. At the end of the dwell portion, said groove terminates in the cam-portions 373 373ª. On the end of the shaft 368 opposite to that on which the segment 369 is located is a lever 374 to which a pin 376 is fixed. A spring 377 for actuating the knotter is connected to said pin 376 and to the anchor 276ª (Fig. 15). Interposed between the bearing 367 and the lever 374 is a resetting lever 380 loose on the shaft 368, and said lever has its rear end bifurcated as at 381, said bifurcation being shown as formed by an insert 382 between two adjacent plates, one of which carries a hand lever 383, the plates and insert being welded or otherwise secured together. The lever 380 has a pin 380ª to engage a shoulder 379 on the lever 374 for resetting the knotter. Connected to the pedal 273 (Fig. 15) is a rod 418 having at its upper end a head 419, said head 419 being provided with a segmental slot 420 in which a pin 421 on the lever 380 is adapted to ride. The knot-tying mechanism can be restored to its initial position, after an operation, by means of the lever 383 or the pedal 273. The bracket 366 has at its lower end a bearing 384 in which is a rock shaft 385.

To one end of the rock shaft 385 is fixed a locking dog 386 which is normally held in engagement with a shoulder 378 on the knotter-actuating lever 374 by means of a spring 388, one end of said spring being connected to a hand lever 387 fixed to the shaft 385. The other end of the spring 388 is connected to an anchor pin 389 set in a post or frame 390 carried by the bracket 366. In the post 390 is mounted a shaft 391 (Fig. 40) on lower end of which is a bevel pinion 392 which meshes with the segmental gear 370 on the segment 369. The opposite end of the shaft 391 is provided with a tying bill 393 which is operatively associated with a stationary cam barrel 394, the construction of the tying bill and the cam barrel being substantially the same as illustrated in detail in my U. S. Patent No. 755,110, dated March 22, 1904. Forward of the tying bill and carried by the post 390 is a guide hook 395 (Fig. 39) having a slot 396 therein. In rear of the tying-bill and carried by the post 390 are two guide hooks 397 and 398 having slots similar to the slot 396 and in line therewith. Between said hooks 397 and 398 is a stripper hook 399 having a reciprocatory movement imparted thereto by a bell crank 400 (Fig. 40). The bell crank 400 is pivotally supported at its angle by a bracket arm 401, and the short arm of said bell crank carries a roller 402 located in the cam groove 371. Pivotally secured to the guide hook 398 at 398ª is a thread clamp 403 comprising two portions 403ª lying at opposite sides of the guide 398 and a longitudinally projecting lip 404 with which the end of the stripper hook 399 is adapted to make contact. The thread clamp is provided with an extension 405 engaged by a link 406 which in turn is connected to a spring 407 anchored to a pin 408 in the side of the bracket 366. The clamp 403 is pivotally moved by the spring 407 so as to place the portions 403ª across the slot in the guide 398 and thereby clamp the threads extending through said slot. The clamp 403 is moved to release the threads by the stripper-hook 399.

On the post 390 is a clamp arm 415, the projection 416 of which carries a spring 417 adapted to hold a reserve thread end between it and the projection 416.

The bracket 366 carries supports in which are secured a pivot bar 409 and two stop bars 410 and 411. On the pivot bar 409 are mounted pivotal thread lifters 412. The thread lifters are shown as comprising bars having at one end eyes 413, the opposite ends being weighted as at 414. When threads are passing through said eyes the tension thereof will be sufficient to keep the lifter in the position indicated by the letter $x$ in Fig. 39, but when a thread becomes exhausted the weighted end 414 of the lifter engaged by said thread will cause the eye 413 to rise and lift the thread above the others so that the operator may readily pick it up and carry the end into the knotter. In Fig. 39 all of the lifters except two have been omitted.

I will next describe the means for maintaining a reserve supply of thread in order that the section beam may continue to wind yarn while one or more sections of the tension-reducing mechanism C are out of operation. In front of the platform 172 is a vertical framework comprising five upright bars 279 (Figs. 42 and 43), said bars constituting guides for four sets of rise rolls to take up slack in the four sheets of threads moving from the sections of the structure B to the warper. The sheets of threads pass from the rolls 177 and 191 (Fig. 12), over the rolls 177ª, through the eyes of the lifters 412 (Fig. 15), under the rolls 272 and over the rolls 280 carried by the standards 170 (Fig. 1), thence under rolls 281 (Fig. 42) at the bottom of the frame formed by the bars 279, thence over rolls 282 carried by brackets or carriages which are slidable on the bars 279, thence around rolls 283 at the bottom of the frame, thence over rolls 284 in said slidable brackets, thence down around rolls 285 at the bottom of the frame, thence up around rolls 282ª in said slidable brackets, down around the bottom rolls 283ª, and thence to the warper.

Each set of rise rolls 282, 282ª, and 284 is carried by a sliding bracket or carriage 286 (Fig. 43) which is capable of moving up and down on the bars 279, said rolls serving to take up and let out slack in the sheets of warp yarn.

Connected to each bracket 286 are one or more ropes or flexible connections 287 which pass around pulleys 288 suspended from suitable supports adjacent the rise rolls, and around pulleys 289 hung from supports near one side of the warper. These flexible connections 287 are attached to weight-carrying stirrups 290 which are slidable on vertical guides 291.

Means is provided for automatically stopping the section beam in the event that the reserve supply of yarn in any one of the four sections becomes exhausted, and for again starting the section beam when the normal amount of reserve yarn has been restored. The starting and stopping means is operated by the stirrups 290. Near the upper end of the path of movement of the stirrups is pivoted a bail 292 (Figs. 43 and 44) arranged to be engaged and moved by rails 293 carried by the stirrups. A weighted arm 294 which is rigid with the bail 292 normally holds the bail in position for engagement by any one of the rails 293. Rigid with the bail 292 is an arm 295 which is connected to a depending rod 296 provided with a finger 297. Said finger controls a mechanism that is arranged to shift the belt 298 that drives the drum 299 which revolves the section beam A'. The drum 299 is fixed to a shaft 300 which is driven through gears 301 and 302 from a shaft 303. The shaft 303 carries a tight pulley 304 and a loose pulley 305. A belt shifter fork 306 is fixed to a slide 307 which is mounted in guides 308. The slide 307 is connected to a rock shaft 309 by means of an arm 310 and a link 311. A weighted arm 312 on the rock shaft 309 normally holds the shaft in such position that the belt 298 is on the tight pulley 304.

The means for turning the shaft 309 to shift the belt 298 to the loose pulley 305 comprises a cam 313 fixed on the drum shaft 300 and engaging a roller stud 314 on a lever 315 which is pivoted at 316. The lever 315 is connected through a link 317 to the lower arm of a lever 318 which is loosely mounted on the rock shaft 309. Normally the lever 318 is continually oscillating. Fixed on the shaft 309 is an arm 319 having pivoted thereto a dog 320 which may be engaged by the upper arm of the lever 318. The dog 320 is normally held up out of reach of the lever 318 by the finger 297. When, however, one of the stirrups 290 is raised into contact with the bail 292, the finger 297 is lowered to place the dog 320 in the path of movement of the upper end of the lever 318, whereupon said lever engages the dog and turns the shaft 309 to shift the belt 298 to the loose pulley. To keep the belt in this position until the stirrup has descended, I provide locking means comprising four arms 321 fixed on the rock shaft 309, each of said arms being arranged to be engaged by a latch 322 pivoted in the supporting framework. Rigid with each latch 322 is a finger 323 arranged to be engaged and moved by the rail 293 of the adjacent stirrup 290 to withdraw the latch from the corresponding arm 321. When the shaft 309 is turned to shift the belt to the loose pulley, the latch 322 corresponding to the raised stirrup drops into engagement with the adjacent arm 321, thus locking the shaft 309 against movement.

Simultaneously with the shifting of the belt, a brake is applied to stop the beam A'. Said brake comprises a drum 324 (Fig. 43) fixed on the shaft 303, and a band 325 extending over the drum 324 and having an end connected to the floor. The other end of the band is connected through a cable 326 and a spring 327 to the arm 312. Thus when the belt is shifted to the loose pulley, the brake band 326 is pulled into braking contact with the drum 324.

When one of the carriages of the rise-roll mechanism has descended far enough to stop the warper, as just described, the other carriages usually are in the uppermost position and therefore unable to take up more slack; consequently the yarn passing over such elevated carriages stops traveling and the bobbins connected with them stop rotating, although the rolls 177 and 191 continue to revolve. When the exhausts that caused the carriage or carriages to descend have been repaired and the tension-reducing rolls 177 and 191 have been reset, the travel of the yarn to such lowered carriage or carriages is resumed, said carriage or carriages rising under the action of their weight-carrying stirrups.

When the stirrup whose elevation caused the warper to stop comes down, the rail 293 thereon engages the finger 323 of the corresponding latch 322 and unlocks the shaft 309, whereupon the weighted arm 312 shifts the belt onto the tight pulley 304, and releases the brake band 325.

In Figs. 1, 42, and 43 is shown a system of belts for communicating motion to the parts to be driven. By reference to Fig. 1, it will be observed that a belt 326 which leads from the source of power, as, for example, a motor-driven shaft or other means, passes around a pulley 327 loose on the main countershaft 328. The shaft 328 carries a pulley 329 around which passes a belt 330 to drive a shaft 331 by passing around a pulley thereon; said shaft 331 carries a pulley 332, which, through the medium of a belt 333, drives the pulley 182. The shaft 331 also carries a pulley 334, which, through the medium of a belt 335, drives the pulley 165. The shaft 328 is provided with a pulley 336 (Fig. 42) in driving connection with either of the pulleys 304 or 305 through the medium of the belt 298.

The warper, which I have designated 338 is of the usual type and is shown as practically unmodified except that the rise-roll is eliminated. The change-speed gear is shown in the present application as being removed from the warper and located on the main countershaft 328. The stopping, starting and change of speed of the entire machine may be effected by the usual pedal (not shown) on the warper through the medium of a link bar 340 (Fig. 43) connected to a bell crank 341 supported by the bracket 342, said bell crank being provided with a weighted arm 343 and one arm of said bell crank being connected to a slide bar 344. The bar 344 carries a fork 344ª embracing the belt 326. In starting the apparatus the operator puts his foot on the pedal and presses it down part way, thereby shifting the belt 326 from the loose pulley 327 to the intermediate or low-speed pulley 339ª. When the operator presses the pedal clear down, the belt is moved onto the pulley 339 which drives the machine at full speed, a catch (not shown) holding the pedal depressed against the tendency of the weight 343.

The warper may be equipped with the usual drop wires 338ª to stop the entire machine should a break in the yarn occur at a point where it could not be taken care of by the uniting mechanism. When a drop wire falls, the catch is released, and the weight 343 returns the belt 326 to the loose pulley 327. I have deemed it unnecessary to illustrate in detail the drop wires and the connection with the pedal-catch, as any common construction of these parts may be used. Fig. 42 shows the usual brake shoe 325ª arranged to bear against the brake drum 324 to stop the beam A' when a drop wire acts.

The shafts carrying the rolls 281, 283 and 285 are driven from the shaft 328 through the medium of belts 345 which pass around the pulleys 346 on said roll-shafts. The rolls 281, 283, 285 are loose on their shafts, but said shafts are driven, as above stated, to obviate the friction that otherwise would exist in the bearings of said rolls and to counteract the friction in the bearings of the rolls in the carriages.

Combs may be arranged at suitable points, the number and location of these combs being varied to meet the conditions under which the machine is operated. I have shown a comb 354 (Fig. 2) carried by the standards 106, a plurality of combs 363 (Fig. 42) adjacent to the rolls at the bottom of the frame formed by the guide posts 279, and combs 364 carried by the brackets 286.

Assuming that the proper number of boxes 90 are provided with bobbins and that the threads from said bobbins are connected with the section beam, the yarn will be drawn from the boxes over and around the rolls 177 and 191, over and around the rise rolls, and onto the beam. When all of the yarn from a bobbin has become exhausted, one of the detectors 247 will drop, because there will be no thread to sustain it. When a detector drops it will assume a position similar to the position of the dropped detector in Fig. 12, so as to hang upon the bar or shoulder 260. As soon as said detector drops, one of the ribs 245 on the constantly rotating fluted roll 244 will engage the lower end of said detector and force it over against the actuating member 210. As it strikes the actuating member 210, said member will be swung on its shaft 209, the arms 211 and 212 striking against the rod 227; and inasmuch as the rod 227 is carried by the hangers 225 fast on the shaft 209, said shaft 209 will be rocked. As the shaft 209 carries the latch 228, the tongue 229ª of said latch will be moved out of contact with the shoulder 231 on the sleeve 232, permitting the spring 267 (Fig. 15) acting through the arm 264 and the rod 263 to swing the segment of the bell crank 199 from right to left. (Figs. 12 and 13). As the bell crank 199 swings from right to left, the pinion 197 in mesh with the teeth of the segment 198 will swing the fork 195 down and around from right to left so that the rolls 191 will move from the position shown in Figs. 11 and 12 to the position shown in Fig. 13, the take-up 269 270 will be actuated, and the drawing of yarn from that particular section will cease because the warper can more easily draw from the rise rolls than from the bobbins. As the bell crank 199 is moved by the spring-actuated rod 263, the cam 243 will move away from the roll 242, permitting the spring 241 to tilt the bar 235 upwardly so that the lip 236 will raise the fallen detector above its fellows as shown in Fig. 13, and the actuating member 210 will swing back to its normal position. This allows the bar 227 to drop, rocking the shaft 209 and the arm 221 enough to lower the dog 204 into operative position. While the operation just described is taking place, the rocked actuating member 210 will have raised the rod 217 which carries the yoke 160, and said yoke will throw the tooth 144 of the dog 141 into position to be engaged by the forward edge of the T-rail 128. When it is remembered that the T-rail is constantly moving back and forth, it will be apparent that as soon as the dog 141 contacts with the T-rail and locks the slide 133 to it, said slide will move forward and eject the nethermost box from the particular stack of the section in which the detector is dropped. As the lowermost box is ejected, the stack will settle and an empty box will be forced onto the table 120 and will at once slide over the bridge 121 onto the stack. When the box containing the reserve bobbin settles into the position occupied by the second box in Fig. 11, the reserve thread passes down through the space 362, past the unsupported end of the adjacent roll 191 and onto the roll 177. It will be remembered that provision is made for a greater number of boxes in each stack than there are threads in that particular stack of which care is to be taken.

When a thread exhausts, as just described, the reserve thread is ready to be united to the loose end of the exhausted thread. The operator need only pass the portion of the exhausted thread extending between the eye 413 of its lifter and the tension-reducing mechanism, through the guide hooks 395, 397 and 398, and give a down pull on the lever 387 to move the dog 386 out of engagement with the shoulder 378 of the lever 374. As soon as this is done the tension spring 377 will exert a pull on the lever 374 and give the shaft a partial rotation which will be sufficient to actuate the tying bill to form the knot. The stripper 399 will remain inactive during the time that the roller 402 is in the dwell portion 372 of the groove 371 so the clamp 403 will not interfere with the thread. When the shaft 368 is rocked sufficiently to cause the tying bill to form the knot, the roller 402 will have moved the length of the dwell portion of the groove 371 and said roll will enter the cam portion 373 of said groove. The entering of the roll 402 into the cam portion 373 of said groove will cause a quick downward movement of the stripper hook 399, so as to permit the clamp 403 to clamp the thread in the guide hook 398. The downward movement of the stripper hook 399 (which it will be observed is between the clamped portion of the thread and the bill) will cause the knotted ends of the exhausted and reserve threads to be stripped from the bill. When the roll 402 enters the cam portion 373ª the stripper hook 399 is moved upwardly into engagement with the lip 404, thereby opening the clamp 403 and releasing the united ends from the knot-tying mechanism. If, now, the operator presses upon the pedal 273 (Fig. 15), the link 277 will swing the bell crank 202 so as to cause the dog 204 to engage the pin 205 and swing the bell crank 199 from left to right, causing the rolls 191 to assume the position shown in Figs. 11 and 12. At the same time that the bell crank swings to resetting position, so as to permit the tongue 229ª of the latch 228 to drop into engagement with the shoulder 231 of the sleeve 232, the cam 243 will make contact with the roller 242 so as to raise said roller and lower the lip 236 so as to permit the previously raised detector to drop onto the thread beneath it and hang thereon until the thread is again exhausted. Before the cam 243 thus acts to lower the detector, the tension-reducing roll 191 has been swung so far toward operative position that the warper has begun to draw from the bobbins. Sufficient tension is thereby placed upon the new thread to cause it to move laterally into proper position against the upstanding detector. The latter is not lowered by the cam 243 until the new thread has thus moved into position to support the detector. The yarn guide and clearers 92 are located at the right-hand side of the bobbin-boxes, the hooks 258 are on the left-hand side of the detectors, and the reserve threads originally extend through the spaces 362 at the left-hand side of the boxes. The natural tendency of the threads to draw into a straight line when the warper begins to draw from the bobbins therefore results in a movement of the new thread to the right until it lies against its detector. Fig. 7ª indicates in dotted lines the various paths the thread may take in passing from the guide and clearer 92 to the detector. The movement of the bell crank 202 also carries the rod 208 against the rod 217, pushing the collar 261 off the bar 174, whereupon the yoke 160 drops into normal position.

If one detector 247 drops immediately after another, the operator, after repairing the first thread connection, resets the knot-tying mechanism by means of the hand lever 383 or by pressing on the pedal 273, picks up the second detector by manually operating the lever 239, ties a reserve thread to the second exhausted thread, and resets the knot-tying mechanism and the tension-reducing mechanism by pressing on the pedal 273.

The slots 235ª (Fig. 13) permit the bar 235 to yield if a detector should be pushed into contact with it by the fluted roll 244, which might occur when the lip 236 was part way down.

It will be seen that the tension-reducing mechanism cannot be reset while a detector is down, for the fluted roll 244 will continue to throw said detector against the actuating member 210, which will move the rod 227, rocking the shaft 209, lifting the arm 221 and raising and holding the dog 204 out of position to engage the pin 205. If while resetting or before the operator's foot is raised from the pedal an exhaust occurs, the raising of the dog 204 out of engagement with the pin 205 permits the spring 267 to throw the tension-reducing mechanism into inoperative position.

When the pedal 273 or the lever 383 is operated to reset the knot-tying mechanism, the downward movement of the bifurcated end of said lever will cause the pin 390ª to make contact with the shoulder 379 and swing the lever 374 around into position so that its shoulder 378 may be engaged by the dog 386.

It is important to keep all breaks within reach of the operator, as it would obviously be troublesome to repair breaks occurring in the yarn at points between the knot-tying mechanism and the warper. The apparatus has therefore been designed to reduce to the minimum the liability of breaks occurring at points past the knot-tying mechanism. The rolls 177 191 reduce the tension upon the yarn between said rolls and the warper to perhaps one-fourth of the tension upon the threads between said rolls and the bobbins, and therefore breaks will almost certainly occur between the bobbins and said rolls, rather than between said rolls and the warper. The great majority of exhausts, however, are caused by the complete unwinding of the threads from the bobbins.

In order that reserve threads may be conveniently united to exhausted threads, it is very desirable that the free ends of exhausted threads shall arrive at approximately a predetermined point before the operation of a section ceases. It also is desirable that the detector mechanism shall not operate until the free end of an exhausted thread has passed its detector, in order to avoid waste, and to prevent the presence of long loose threads between the detectors and the bobbin-boxes. By reason of the three-point construction of the detectors, they are held up until the free ends have passed or almost passed the detectors. The threads are laced between the rods 254 and the points of the detectors and hence will sustain the detectors so long as there is a slight amount of tension upon said threads, the tension placed upon the threads being sufficient to hold the detectors up until the free ends arrive at the detectors. Although the threads run quite rapidly, the detector mechanism acts quickly enough to prevent a free end from passing the knot-tying mechanism. When a section is thrown out of operation, the rods 270 271 place additional drag on the threads and thereby assist to stop the running of the threads so that the end of the exhausted thread shall not run too far past the detectors.

A reserve thread is placed in operative position by putting a bobbin into the topmost box, placing the yarn in the guide and clearer 92, passing said yarn under the hook 93 by "wiping" the yarn through the notch 359, placing the yarn in the space 362, and carrying the free end to the clamp 416 417. The yarn is now in readiness to pass down through the slot 362 and between the rolls 177 191 when the box settles in the stack.

It will be seen that the arrangement of the bobbing-box-supporting structure B and the boxes 90 is such as to accommodate a large number of bobbins in a relatively small space and still insure that each bobbin and thread shall be separate from the others all the way to the detectors.

It will be understood that the mechanisms herein shown are susceptible to various modifications and that the relation of said mechanisms to each other may be changed. I therefore do not limit myself to the details illustrated and described.

I claim as my invention:

1. A winder having, in combination, means for winding threads upon a beam; a carriage having a roll; and a plurality of stationary rolls, one of which is driven, the threads passing from said driven roll to the roll on said carriage, thence to another of said stationary rolls, and thence to said winding means.

2. The combination of a warper, means for driving the warper, means for disconnecting the warper from the driving means to stop the warper, and a thread-controlled reserve-supply-accumulating roll over which the yarn extends to the warper, said roll being arranged to render the disconnecting means effective.

3. The combination, with beam rotating means, of means for accumulating a reserve supply in the threads, and means operated by said reserve-supply-accumulating means for stopping the beam-rotating means.

4. The combination, with beam-rotating means, of means to stop the beam-rotating means, means for accumulating a reserve supply in the threads, and means operated by said reserve-supply-accumulating means for restarting the beam rotating means.

5. A winder having, in combination, means for winding yarn; means tending to feed yarn to the winding means; and means for stopping the action of the second mentioned means without stopping the reception of yarn by the receiving means.

6. A winder having, in combination, means tending to feed yarn; means for receiving the yarn; means for containing a reserve supply of yarn between the first mentioned means and the receiving means; and means for stopping the action of the first mentioned means to permit the receiving means to receive yarn from the reserve-supply-containing means.

7. A winder having, in combination, means to contain a reserve supply of yarn; means tending to feed yarn to said containing means; means to receive yarn from said containing means; and means for rendering temporarily ineffective the means which tends to feed the yarn.

8. A winder having, in combination, means tending to feed yarn from bobbins to a section beam, said means being divided into a plurality of independent sections all normally working in unison; and means for stopping one of said sections without disturbing the operation of the remaining sections.

9. A winder having, in combination, two rolls having smooth peripheries and arranged to form a loop in a thread; means for winding the thread; and means for rotating said rolls at a greater peripheral speed than the speed of winding, to reduce the tension upon said thread in the region between the winding means and the rolls.

10. A winder having, in combination, a tension-reducing roll and a coöperating member, one of said elements being arranged to be moved into inoperative position and thereby create slack in the threads; and means for taking up said slack.

11. A winder having, in combination, a tension-reducing roll and a coöperating member, one of said elements being arranged to be moved into inoperative position and thereby create slack in the threads; means for moving said elements into inoperative position; and means for taking up said slack, said take-up means being operated by said moving means.

12. A winder having, in combination, two rolls having smooth peripheries and arranged to form a loop in a thread; means for winding the thread; and means for rotating said rolls at a greater peripheral speed than the speed of winding, to reduce the tension upon said thread in the region between the winding means and the rolls, one of said rolls being supported at one end only, to permit of passing the thread into the space between the rolls.

13. A winder having, in combination, a thread-engaging roll; a movable part carrying a complementary roll; means tending to move said part to throw the complementary roll into operative position, said means comprising a lever; a rock shaft carrying means adapted to prevent movement of said lever; a member pivoted on said shaft and arranged to rock said shaft; a detector; means for moving said detector against said member; a lever carrying a dog adapted to engage the first mentioned lever; means for moving the second mentioned lever; and a connection between said rock shaft and said dog.

14. A winder having, in combination, a thread-engaging roll, and a complementary roll movable into and out of operative position, said complementary roll having movement about the axis of the first mentioned roll.

15. A winder having, in combination, a constantly driven thread-engaging roll, and a complementary roll movable into and out of operative position, said complementary roll having movement about the axis of said constantly driven roll and receiving motion therefrom.

16. A winder having, in combination, a thread-engaging roll; a complementary roll arranged for bodily movement in a path concentric with the first mentioned roll; and means for driving said rolls, a space being provided at one end of the complementary roll for the insertion of a thread between said rolls.

17. A winder having, in combination, supporting members; a thread-engaging roll carried by said members; said members having grooves concentric with the axis of said roll; a frame having trunnions fitting in said grooves; and a thread-engaging roll in said frame.

18. A winder having, in combination, supporting members; a thread engaging roll carried by said members; said members having grooves concentric with the axis of said roll; a frame having trunnions fitting in said grooves; a thread-engaging roll in said frame; means for moving said frame; and means for locking said frame against movement.

19. A winder having, in combination, tension-reducing means; means for throwing said tension-reducing means out of operation; a thread-controlled member for operating said throw-out means; a restoring mechanism for the tension-reducing means; and means for temporarily rendering said restoring means ineffective to restore the tension-reducing means.

20. A winder having, in combination, tension-reducing rolls; means for rendering said rolls inoperative; a gravity device for controlling said means; a resetting mechanism for the rolls to render them operative; and means actuated by the resetting means for restoring the gravity device to position.

21. The combination of beam supporting and rotating means, a creel, the threads extending from the creel to the beam, tension-reducing means adjacent to the creel, detectors on the threads adjacent to the beam supporting and rotating means, and other detectors on the threads adjacent to the creel, the last mentioned detectors being arranged to render the tension-reducing means ineffective, and the first mentioned detectors being arranged to stop the tension-reducing means and the beam-rotating means.

22. A winder having, in combination, tension-reducing means; means for rendering said tension-reducing means ineffective; detector means for operating said means for rendering the tension-reducing means ineffective; and means for restoring the tension-reducing means, said detector means being arranged to control the operation of said restoring means.

23. A winder having, in combination, thread-engaging rolls; means for moving one of said rolls out of operative relation with another roll; detector means for operating said roll-moving means; and means for actuating the roll-moving means to restore the rolls to operative position, said detector means being adapted to prevent operation of said means for actuating the roll-moving means.

24. A winder having, in combination, thread-engaging rolls; means for moving one of said rolls out of operative relation with another roll; detector means for operating said roll-moving means; a member adapted to engage the roll-moving means for actuating said means to restore the rolls to operative relation; and means for moving said member, the detector means being arranged to prevent engagement of said member with said roll-moving means.

25. A winder having, in combination, thread-engaging rolls; means for moving one of said rolls out of operative relation to another of said rolls; detector means for operating said roll-moving means; a lever carrying a dog adapted to engage said roll-moving means; means for moving said lever; and a connection between the detector means and said dog.

26. A winder having, in combination, thread-engaging rolls; means for moving one of said rolls out of operative relation to another of said rolls; a rock shaft; detector means for rocking said shaft; means operated by said shaft for releasing said roll-moving means to action; a lever carrying a dog adapted to engage said roll-moving means; means for moving said lever; and a connection between said shaft and said dog.

27. A winder having, in combination, thread-engaging rolls; means for moving one of said rolls out of operative relation to another of said rolls; a rock shaft carrying means adapted to release said roll-moving means to action; an arm on said shaft; a member adapted to engage said arm; a detector; means for moving said detector into engagement with said member; a lever carrying a dog adapted to engage the roll-moving means; means for moving said lever; and a connection between said shaft and said dog.

28. A winder having, in combination, a thread-engaging roll; a bracket carrying a complementary roll; means for guiding said bracket to carry the complementary roll around the other roll; means tending to move said bracket to throw the complementary roll into operative position, said means comprising a lever; a rock shaft carrying means adapted to prevent movement of said lever; a member pivoted on said shaft and arranged to rock said shaft; a detector; means for moving said detector against said member; a lever carrying a dog adapted to engage the first mentioned lever; means for moving the second mentioned lever; and a connection between said rock shaft and said dog.

29. A winder having, in combination, a thread-engaging roll; a bracket carrying a complementary roll; means for guiding said bracket to carry the complementary roll around the other roll; means tending to move said bracket to throw the complementary roll into operative position, said means comprising a lever; a rock shaft carrying means adapted to prevent movement of said lever; a member pivoted on said shaft and arranged to rock said shaft; a detector; means for moving said detector against said member; a lever carrying a dog adapted to engage the first mentioned lever; means for moving the second mentioned lever; a connection between said rock shaft and said dog; a lever adapted to elevate the fallen detector; a spring tending to move said detector-elevating lever; and a cam on the first mentioned lever adapted to hold the detector-elevating lever against operation.

30. The combination of a thread-engaging roll, supporting members having annular grooves therein concentric with said roll, a suitably supported bracket having trunnions engaging in said grooves, a complementary roll carried by said bracket, an oscillatory shaft carrying a fork, an arm on said bracket engaging said fork, and means for rocking said shaft to move said bracket.

31. The combination of a thread-engaging roll, supporting members having annular grooves therein concentric with said roll, a bracket having near one end trunnions engaging in said grooves, means for slidably and pivotally supporting the opposite end of said bracket, a complementary roll carried by said bracket, and means for moving said bracket.

32. The combination of a thread-engaging roll, supporting members having annular grooves therein concentric with said roll, a bracket having near one end trunnions engaging in said grooves, means for slidably and pivotally supporting the opposite end of said bracket, a complementary roll carried by said bracket, an oscillatory shaft carrying a fork, an arm on said bracket engaging said fork, and means for rocking said shaft.

33. The combination of beam supporting and rotating means, a creel, the threads extending from the creel to the beam, means adjacent to the creel for guiding the threads into the form of a sheet, tension-reducing means, a set of detectors on the threads adjacent to said guiding means, said detectors being arranged to render the tension-reducing means ineffective, and a set of detectors on the threads adjacent to the beam supporting and rotating means, the last mentioned detectors being arranged to stop the tension-reducing means and the beam-rotating means.

34. A winder having, in combination, thread-engaging means arranged to be moved into inoperative position and thereby create slack in the threads; means for moving said thread-engaging means into inoperative position; and means for taking up said slack, said take-up means being operated by said moving means.

35. A winder having, in combination, a structure forming an endless way; bobbin-containers in said way; means for moving said containers through said way; and means for rotating a warp beam for unwinding bobbins in a plurality of said containers.

36. A winder having, in combination, a structure forming an endless way extending in a vertical plane; bobbin-containers in said way; means for moving said containers; and means for unwinding bobbins in said containers.

37. A winder having, in combination, a structure forming an endless way; bobbin-containers in said way; and means for moving said containers, each of said containers having an open side, and said way being adapted to dispose each container so that the bobbin therein may drop out.

38. A winder having, in combination, a structure forming an endless way; bobbin-containers in said way, each of said containers having an open side; means of moving said containers, a portion of said way being open, said portion being adapted to tilt the containers so that the bobbins may drop out; and a guard member for retaining the bobbins in their containers during a portion of their travel.

39. A winder having, in combination, a structure forming an endless way; bobbin-containers in said way, each of said containers having an open side; means for moving said containers, a portion of said way being open, said portion being adapted to tilt the containers so that the bobbins may drop out; and a pivoted guard member for retaining the bobbins in their containers during a portion of their travel, the free end of said member vibrating in and out of the open sides of the containers as they pass said member.

40. A winder having, in combination, means for supporting a row of bobbin-containers; means for unwinding yarn from bobbins in said containers; and means for removing a container from the row; and means for returning said container to the row.

41. A winder having, in combination, means for supporting a row of bobbin-containers; means for unwinding yarn from the bobbins in said containers; means for removing a container from said row; and means for then removing the bobbin from the container.

42. A winder having, in combination, means for supporting a row of bobbin-containers; means for unwinding yarn from said containers; means for removing the containers one at a time from the row, and means for removing the contained bobbins from removed containers.

43. A winder having, in combination, a stack of detached bobbin-containers; means for removing containers from and adding containers to said stack; and means for unwinding bobbins in said containers.

44. A winder having, in combination, a stack of detached bobbin-containers; means for removing containers from and adding containers to said stack; means for unwinding bobbins in said containers; and means for removing bobbins from the containers.

45. A winder having, in combination, a plurality of bobbin-containers in a row; and means for removing said containers from said row comprising a slide having a bar-engaging means, a constantly reciprocating bar to be intermittently engaged by said bar-engaging means, and means for actuating said bar-engaging means.

46. A winder having, in combination, a plurality of bobbin-containers in a row; and means for removing said containers from said row comprising a slide having a bar-engaging means, a constantly reciprocating bar to be intermittently engaged by said bar-engaging means, means for actuating said bar-engaging means, and means for disconnecting said bar-engaging means from said bar.

47. A winder having, in combination, a plurality of bobbin-containers in a row; and means for removing said containers from said row comprising a slide having a dog and a reciprocatory member to be engaged by said dog.

48. A winder having, in combination, a plurality of bobbin-containers in a row; and means for removing said containers from said row comprising a slide having a spring-pressed dog and a reciprocatory member to be engaged by said dog.

49. A winder having, in combination, a plurality of bobbin-containers in a row; and means for removing said containers from said row comprising a slide having a spring-pressed dog, a movable member to be engaged by said dog, and means for operating the dog.

50. A winder having, in combination, bobbin-moving means comprising a plurality of slides, a reciprocatory member, means carried by each of said slides to engage said member, means for moving said engaging means into operative position, and means for moving said engaging means out of operative position.

51. A winder having, in combination, bobbin-moving means comprising a plurality of slides, a reciprocatory bar, means carried by each slide to connect said slide to said bar, means for moving said engaging means into operative position, a rock shaft moving with said bar, means on said shaft adapted to engage said engaging means, and means for reciprocating said bar and rocking said shaft.

52. A winder having, in combination, bobbin-moving means comprising a plurality of slides, a reciprocatory bar, means on each of said slides for connecting said slide to said bar, means for moving said engaging means into operative position, a rock shaft connected with said bar to slide therewith, an arm fixed on said rock shaft, a crank connected with said arm, and means fixed to said rock shaft and adapted to engage said engaging means 53. A winder having, in combination, bobbin-moving means comprising a plurality of slides, a reciprocatory bar, means on each of said slides for connecting said slide to said bar, means for moving said engaging means into operative position, a rock shaft connected with said bar to slide therewith, an arm fixed on said rock shaft, a crank connected with said arm, a bar fixed to said rock shaft, and pins on the last mentioned bar adapted to engage said engaging means.

54. A winder having, in combination, means for supporting a row of bobbins; means for winding thread from said bobbins onto a beam; a slide for removing bobbins from said row; means for operating said slide; a pivoted member connected to the slide-operating means; detectors for the threads; and means for moving a failen detector into engagement with said pivoted member to operate said slide.

55. A winder having, in combination, suitable guides, a row of bobbin-containers in said guides; means for unwinding yarn from the bobbins in said containers; and means for removing a container from the row when a thread connection between one of the containers and the unwinding means is broken.

56. A winder having, in combination, a plurality of boxes arranged in rows and adapted to contain bobbins; a thread-receiving means; means for ejecting a box from a row when a thread connection between the thread-receiving means and a bobbin is destroyed, said means comprising a slide; an actuating member for said slide; means for causing said slide to temporarily connect with said actuating means comprising a vertically reciprocatory rod provided with a collar; means for lifting said rod; means engaging said collar when the rod is lifted; and means for disengaging said collar from said engaging means.

57. A winder having, in combination, a row of bobbin-containers; means for unwinding yarn from bobbins in said containers; ejecting means for removing a container from its row when a thread connection between said container and the unwinding means is destroyed; means operated by mechanism controlled by a thread for rendering said ejecting means operative; means for rendering said last mentioned means inoperative; and means for restoring said means to operative position.

58. A winder having, in combination, a plurality of bobbin-containers; a structure adapted to support said containers in a stack; guide means at the upper end of the structure for a reserve thread extending from a bobbin in the topmost container; and means for drawing threads from bobbins in the containers.

59. A winder having, in combination, a plurality of bobbin-containers; a structure adapted to support said containers in a stack; guide means at the upper end of the structure for a reserve thread extending from a bobbin in the topmost container; means adjacent to the topmost container for guiding threads extending from other containers in the stack; and means for drawing threads from bobbins in the containers.

60. A winder having, in combination, a plurality of bobbin-containers; a structure adapted to support said containers in a stack; a roll near the upper end of the structure over which threads from containers in the stack extend; and means on each container for guiding threads coming from other containers.

61. A winder having, in combination, a plurality of bobbin-containers; a structure adapted to support said containers in a stack; a grooved thread-guiding roll near the upper end of the structure over which extend threads from containers in said stack; and parallel vertical thread-guiding grooves on the alined ends of said containers.

62. A winder having, in combination, individual bobbin boxes resting on top of one another; each box being adapted to contain a single bobbin; and means for simultaneously unwinding the yarn from bobbins contained in a plurality of said boxes.

63. A winder having, in combination, a vertical tier of individual bobbin boxes; each box being adapted to contain a single bobbin, a guide roll adjacent to the upper end of the tier; and means for unwinding yarn from bobbins contained in said boxes, the yarn extending over said guide roll.

64. A winder having, in combination, a vertical tier of bobbin boxes; a guide roll adjacent to the upper end of the tier; means for unwinding yarn from bobbins contained in said boxes, the yarn extending over said guide roll; and means on the alined ends of said boxes for guiding threads to said roll.

65. A winder having, in combination, a plurality of tiers of bobbin boxes, means for supporting and guiding the tiers of boxes for downward movement of the boxes as the bobbins become exhausted, and means for simultaneously unwinding yarn from the bobbins in a plurality of said boxes.

66. A winder having, in combination, a plurality of tiers of bobbin boxes, guide means adjacent to the upper end of the tiers for guiding the threads extending from the bobbins in the boxes, means for unwinding the yarn from bobbins contained in said boxes, tension-reducing means located between said guide means and said unwinding means, reserve-supply-accumulating means located between the unwinding means and the tension-reducing means, and detector means controlling the operation of said tension-reducing means, said detector means being located between said guide means and said tension-reducing means.

67. The combination of a warper, a driving element for the warper, means for shifting the driving element to stop the warper, a reciprocatory element adapted to actuate the shifting means, a thread-controlled reserve-supply-accumulating roll over which the yarn extends to the warper, and means actuated by said roll for effecting engagement of said reciprocatory element with said shifting means.

68. The combination of a warper, a driving element for the warper, means for shifting the driving element, a reciprocatory element adapted to actuate the shifting means, a movable supporting carriage, a roll on said carriage over which the yarn extends to the warper, a weight tending to move the carriage against the tension of the threads, a member on the shifting means movable into and out of the path of movement of said reciprocatory element, means normally holding said member out of the path of movement of said reciprocatory element, and means moving with the carriage for withdrawing said holding means.

69. The combination of a warper, a driving element for the warper, means for shifting the driving element to stop and start the warper, means tending to operate the shifting means to start the warper, means for locking the shifting means against the action of said operating means, a thread-controlled roll over which the yarn extends to the warper, and means actuated by said roll for withdrawing said locking means.

70. A winder having, in combination, means for rotating a warp beam, a creel, means tending to feed yarn from the creel to the beam, means for driving the last mentioned means independently of the beam-rotating means, means for starting and stopping the beam-rotating means, and means for accumulating a reverse supply in the threads during the time the beam is at rest, said accumulating means being arranged to operate the starting and stopping means.

71. In a bobbin supporting structure for winders, two bobbin boxes placed one above the other, and means upon the exterior of one end of one box for guiding a thread coming from the other box.

72. In a bobbin supporting structure for winders, a plurality of bobbin boxes stacked one above another, corresponding ends of all of the boxes being exteriorly grooved to provide guides for the threads, the grooves being in alinement to form continuous guide grooves extending from top to bottom of the stack.

73. A winder having, in combination, means for rotating a warp beam, a sectional creel, means tending to feed yarn from the creel to the beam, the last mentioned means being divided into sections corresponding to the sections of the creel, means for driving the last mentioned means independently of the beam-rotating means, and means for accumulating a reserve supply in the threads, said accumulating means consisting of sections corresponding to the sections of the creel.

74. A winder having, in combination, means for rotating a warp beam, a sectional creel, means tending to feed yarn from the creel to the beam, the last mentioned means being divided into sections corresponding to the sections of the creel, means for driving the last mentioned means independently of the beam rotating means, means for accumulating a reserve supply in the threads, said accumulating means consisting of sections corresponding to the sections of the creel, and means for starting and stopping the beam-rotating means, said starting and stopping means being controlled by each section of the accumulating means.

75. A winder having, in combination, means for winding threads upon a beam; a knot-tying mechanism arranged adjacent to the path of the threads being unwound; and means adjacent to said mechanism for lifting an exhausted thread above its fellows.

76. A winder having, in combination, means for winding threads upon a beam; a knot-tying mechanism arranged adjacent to the path of the threads being unwound; and means adjacent to said mechanism for indicating an exhausted thread.

77. A winder having, in combination, means for winding threads upon a beam; a knot-tying mechanism; and a series of pivoted members each provided with an eye through which a thread extends, said series being mounted adjacent to said knot-tying mechanism, each of said members tending to lift its thread above the other threads, and being normally held against movement by the tension of its thread.

78. A winder having, in combination, means for winding threads upon a section beam, the threads being divided into groups; and a knot-tying mechanism stationarily mounted adjacent to each group.

79. A winder having, in combination, means for supporting a plurality of thread-containers for free revolution; each container containing a single thread; means for revolving a warp beam to which all of the threads extend; means for reducing the tension of the threads in the region between the tension-reducing means and the beam; and means for accumulating a reserve supply in the threads between the tension-reducing means and the beam, said accumulating means being divided into a plurality of independent sections each operating upon a plurality of threads.

80. A winder having, in combination, means for supporting a plurality of thread-containers for free revolution, each container containing a single thread; means for revolving a warp beam to which all of the threads extend; vertical guide means; a plurality of carriages having means over which the threads extend, said carriages being guided by said guide means and having limited upward and downward movement; weights tending to move said carriages upwardly to accumulate a reserve supply in the sheet of threads; and means for stopping the beam-revolving means when a carriage reaches its downward limit of movement.

81. A winder having, in combination, means for supporting a plurality of thread-containers for free revolution, each container containing a single thread; means for revolving a warp beam to which all of the threads extend; means for reducing the tension of the threads in the region between the tension-reducing means and the beam, said tension-reducing means being divided into a plurality of independent sections, each operating upon a plurality of threads; means for rendering a section of the tension-reducing means ineffective upon the breakage of a thread in that section; and means for accumulating a reserve supply in the threads between the tension-reducing means and the beam, said accumulating means being divided into a plurality of independent sections corresponding to the sections of the tension-reducing means.

82. A winder having, in combination, means for supporting a plurality of thread-containers for free revolution, each container containing a single thread; means for revolving a warp beam to which all of the threads extend; means for reducing the tension of the threads in the region between the tension-reducing means and the beam, said tension-reducing means being divided into a plurality of independent sections, each operating upon a plurality of threads; vertical guide means; a plurality of carriages having means over which the threads extend, said carriages being guided by said guide means and having limited upward and downward movement, there being one carriage for each section of the tension-reducing means; a weight acting upon each carriage and normally sufficient to hold said carriage in its uppermost position; guide means adjacent to the lowermost position of said carriages for guiding the sheet of threads to said carriages; and guide means adjacent to the lowermost position of the carriages for guiding the sheet of threads from the carriages to the warp beam.

83. A winder having, in combination, means for supporting a plurality of thread-containers for free revolution, each container containing a single thread; means for revolving a warp beam to which all of the threads extend; means for reducing the tension of the threads in the region between the tension-reducing means and the beam, said tension-reducing means being divided into a plurality of independent sections, each operating upon a plurality of threads; vertical guide means; a plurality of carriages having means over which the threads extend, said carriages being guided by said guide means and having limited upward and downward movement, there being one carriage for each section of the tension-reducing means; a weight acting upon each carriage and normally sufficient to hold said carriage in its uppermost position; guide means adjacent to the lowermost position of said carriages for guiding the sheet of threads to said carriages; guide means adjacent to the lowermost position of the carriages for guiding the sheet of threads from the carriages to the warp beam; means for rendering a section of the tension-reducing means ineffective upon the breakage of a thread in that section; the warp beam drawing thread from the carriage corresponding to said section while said section is ineffective; and means for stopping the beam-revolving means when a carriage reaches its downward limit of movement.

84. A winder having, in combination, means for supporting a plurality of thread-containers for free revolution, each container containing a single thread, means for revolving a warp beam to which all of the threads extend, means for reducing tension in the threads, means for rendering the tension-reducing means ineffective, a reserve-supply-accumulating roll over which the threads extend, said roll being supported for limited upward and downward movement, a weight acting upon said roll and normally sufficient to hold said roll in its uppermost position, but permitting the roll to descend when the tension-reducing means is ineffective, guide means adjacent to the lowermost position of said roll for guiding the sheet of threads to said roll, and guide means adjacent to the lowermost position of the roll for guiding the sheet of threads from the roll to the warp beam.

85. A winder having, in combination, means for supporting a plurality of thread-containers for free revolution, each container containing a single thread, means for revolving a warp beam to which all of the threads extend, a plurality of reserve-supply-accumulating carriages having means over which the threads extend, said carriages being supported for limited upward and downward movement, a weight acting upon each carriage and normally sufficient to hold said carriage in its uppermost position, guide means adjacent to the lowermost position of said carriages for guiding the sheet of threads to said carriages, and guide means adjacent to the lowermost position of the carriages for guiding the sheet of threads from the carriages to the warp beam.

86. A winder having, in combination, a guideway, a thread-guiding roll at one end of the guideway, and a column of bobbin boxes in said guideway, one end of each of the boxes being grooved, the grooves extending longitudinally of the guideway, and the grooves in one box being alined with those of adjacent boxes, said grooves forming with the adjacent wall of the guideway a plurality of closed channels through which threads may pass from the boxes to the roll.

87. A winder having, in combination, winding means, a creel to hold the yarn masses being unwound, and means connected to the creel for conveying creel elements to the creel.

88. The combination of a creel, and a chute for creel elements, said chute leading to the top of the creel.

89. A winder having, in combination, winding means, a creel to hold the yarn masses being unwound, and means for discharging creel elements from and returning them to the creel.

90. The combination of a creel, and a guide for creel elements, said guide extending to a point near the top of the creel.

91. A winder having, in combination, means for supporting a row of bobbin-containers; means for unwinding yarn from bobbins in said row of containers; and means for adding a container to the row.

92. A winder having, in combination, means for supporting a row of creel elements; means for unwinding yarn from bobbins carried by said row of creel elements; means for removing a creel element from said row; and means for subsequently removing the bobbin from such creel element.

93. A winder having, in combination, means forming an endless way extending in a vertical plane; creel-elements in said way; means for moving said elements; and means for unwinding bobbins carried by said elements.

94. A winder having, in combination, an individual bobbin-container having an open side, and means for tilting the container so that the bobbin therein may drop out.

95. A winder having, in combination, a bobbin-container having an open side; means forming a path through which the container may travel; and means for moving said container, a portion of said path being adapted to tilt the container so that the bobbin may drop out.

96. A winder having, in combination, means forming a path for bobbin containers; bobbin-containers each having an open side; means for moving said containers, a portion of said path being adapted to tilt the containers so that the bobbins may drop out; and a pivoted guard member for retaining the bobbins in their containers during a portion of their travel, the free end of said member vibrating in and out of the open sides of the containers as they pass said member.

97. A winder having, in combination, a plurality of bobbin-containers; a structure adapted to support said containers in a stack; means adjacent to the topmost container for guiding threads extending from containers in the stack; and means for drawing said threads.

98. A winder having, in combination, a vertical row of creel elements; means near the upper end of the row over which threads from yarn masses carried by said creel elements extend; and means on each creel element for guiding threads coming from other creel elements.

99. A winder having, in combination, a plurality of bobbin-containers; a structure adapted to support said containers in a stack; means near the upper end of the structure over which extend threads from containers in said stack; and parallel vertical thread-guiding grooves on the alined ends of said containers.

100. A winder having, in combination, a creel, means to wind the threads extending from the creel, means to reduce tension in said threads, means to accumulate a reserve supply in the threads, means to increase the drag on the threads, and means to alternately place the tension-reducing means and the drag means in operation.

101. A winder having, in combination, warp-beam-supporting and rotating means, a creel, the threads extending from the creel to the beam, means engaging the threads for reducing the tension therein in a certain region, the tension-reducing means being driven independently of the beam-rotating means, and means located between the tension-reducing means and the beam for accumulating a reserve supply in the threads to furnish thread to the beam when the tension-reducing means is not operating.

102. A winder having, in combination, a creel divided into sections, means adjacent to the creel for guiding the threads in each section into the form of a sheet, means for winding the threads, and an independent means for accumulating a reserve supply in each sheet of threads.

103. A winder having, in combination, beam-supporting and rotating means, a creel, the threads extending from the creel to the beam, means for reducing the tension of the threads in a certain region, detectors engaging said threads between the tension-reducing means and the creel, the tension-reducing means being arranged to be rendered inoperative by the detectors, means intermediate the tension-reducing means and the beam for accumulating a reserve supply in the threads, and means for placing additional drag on the threads when the tension-reducing means is rendered inoperative.

104. A winder having, in combination, a creel, a winding means to which the threads from the creel extend, means for accumulating a reserve supply in the threads, means for reducing the tension of the threads in the region between the tension-reducing means and the reserve-supply-accumulating means, means intermediate the tension-reducing means and the reserve-supply-accumulating means for placing additional drag on the threads, and means for alternately placing the tension-reducing means and the drag-placing means in operation.

105. A winder having, in combination, winding means, means for reducing tension in the thread being wound, means for placing a drag on the thread at a point between the tension-reducing means and the winding means, and means for alternately placing the tension-reducing means and drag-placing means in operation.

106. A winder having, in combination, a detector having a lateral hook by means of which the detector may be supported upon a thread, and means for bringing a thread alongside the detector and beneath the hook.

107. A winder having, in combination, a detector adapted to be supported upon a thread, means for moving the detector out of normal position, and means for moving a thread into position adjacent to the detector so that upon the return of the detector to normal position the detector will be supported upon the thread.

108. A winder having, in combination, winding means, detectors arranged to be supported upon the threads being wound, and automatic means coöperating with the winding means for operatively relating detectors with the threads.

109. A winder having, in combination, a detector having a lateral hook by means of which the detector may be supported upon a thread, a creel element movable to bring a thread extending therefrom below the plane of the hook, means for placing tension upon the thread to cause it to move laterally into position alongside the detector, and means for lowering the detector.

110. A winder having, in combination, beam-rotating means, means for stopping the beam-rotating means, and thread-controlled means for restarting the beam-rotating means.

111. A winder having, in combination, winding means, a device tending to start the winding means, a latch to lock said device in inoperative position, and thread-controlled means to automatically release the latch.

112. A winder having, in combination, a friction drum for rotating a section beam, a drive pulley operatively connected to said drum, a drive belt, a shifter tending to shift the belt onto the drive pulley, a latch to lock the shifter against action, thread-controlled means to operate the latch, and means to operate the shifter to move the belt off the drive pulley.

113. A winder having, in combination, winding means, a roll bearing against the threads being wound, a device tending to start the winding means, a device to place the starting device in inoperative position, and a latch to lock the starting means in such position, said roll being arranged to cause operation of the second mentioned device and the latch.

114. A winder having, in combination, winding means, a creel to hold the bobbins being unwound, said creel consisting of a supporting structure and a plurality of bobbin supports in said structure, and means for removing bobbin supports from said structure.

115. A winder having, in combination, winding means, a creel to hold the bobbin being unwound, said creel comprising a supporting structure and a vertical series of bobbin supports in said structure, and means for discharging bobbin supports from the lower end of said structure.

116. A winder having, in combination, a plurality of series of bobbin supports; a plurality of members, one for each series, for discharging bobbin supports; an actuator; and means for selectively connecting said members to said actuator.

117. A winder having, in combination, a creel, means for winding threads extending from the creel, means for reducing the tension of the threads in the region between the tension-reducing means and the winding means, reserve supply accumulating means located between the winding means and the tension-reducing means, and detector means controlling the operation of said tension-reducing means, said detector means being located between the creel and the tension-reducing means.

118. A winder having, in combination, means for winding a warp, a creel, the threads being pulled from the creel by the winding means, a reserve supply accumulating means intermediate the creel and the winding means, means adjacent to the creel for reducing tension in the threads, detectors on the threads, said detectors being arranged to render the tension-reducing means ineffective, detectors on the threads adjacent to the winding means, the last mentioned detectors being arranged to stop the tension-reducing means and the winding means.

119. A winder having, in combination, a stack of bobbin containers supported for descending movement, a clamp to hold the end of a reserve thread extending from the top container, and tension-reducing mechanism, the descent of the top box placing the reserve thread in proximity to the tension-reducing mechanism.

120. A winder having, in combination, a plurality of bobbin containers, means for winding threads extending from the bobbins, a knitter stationarily located adjacent to the path of the running threads, and a clamp to hold the end of a reserve thread extending from one of the containers, said reserve thread being supported in operative relation to the knotter.

HOWARD D. COLMAN.

Witnesses:
 WM. D. HINTZE,
 LOUISE A. CULVER.

It is hereby certified that in Letters Patent No. 1,191,102, granted July 11, 1916, upon the application of Howard D. Colman, of Rockford, Illinois, for an improvement in "Winders," errors appear in the printed specification requiring correction as follows: Page 4, line 117, for the word "housing" read *housings;* page 5, line 84, for the reference-numeral "229" read *229ª;* page 7, line 54, for the word "mechanism" read *mechanisms;* page 11, line 68, for the reference-numeral "390ª" read *380ª;* page 12, line 95, claim 11, for the word "elements" read *element;* page 17, line 14, claim 70, for the word "reverse" read *reserve;* page 20, line 107, claim 120, for the word "knitter" read *knotter;* and that the said Letters Patent should be read with these corrections therein that the same may conform to the record of the case in the Patent Office.

Signed and sealed this 3d day of October, A. D., 1916.

[SEAL.]

F. W. H. CLAY,
*Acting Commissioner of Patents.*